United States Patent [19]

Schulz et al.

[11] Patent Number: 5,586,029
[45] Date of Patent: Dec. 17, 1996

[54] SHIFT CONTROL SYSTEM FOR A MULTIPLE RATIO AUTOMATIC TRANSMISSION WITH MANUAL RATIO RANGES

[75] Inventors: Winfried F.-X. Schulz, Pulheim; Johann Kirchhoffer, Cologne, both of Germany

[73] Assignee: Ford Motor Company, Dearborn, Mich.

[21] Appl. No.: 526,620

[22] Filed: Sep. 11, 1995

Related U.S. Application Data

[62] Division of Ser. No. 323,464, Oct. 14, 1994.

[51] Int. Cl.[6] .................................................. B60K 41/06
[52] U.S. Cl. ...................... 364/424.08; 477/53; 477/125; 477/908
[58] Field of Search ........................... 364/424.1; 477/53, 477/54, 125, 908

[56] References Cited

U.S. PATENT DOCUMENTS

| | | | |
|---|---|---|---|
| 4,688,449 | 8/1987 | Harara et al. | 477/908 X |
| 4,718,311 | 1/1988 | Hayakawa et al. | 477/125 |
| 4,722,249 | 2/1988 | Harara et al. | 477/121 |
| 4,724,725 | 2/1988 | Harara et al. | 477/125 |
| 4,945,482 | 7/1990 | Nishikawa et al. | 364/424.1 |
| 5,029,087 | 7/1991 | Cowan et al. | 364/424.1 |
| 5,081,886 | 1/1992 | Person et al. | 74/866 |
| 5,150,297 | 9/1992 | Daubenmier et al. | 364/424.1 |
| 5,157,608 | 10/1992 | Sankpal et al. | 364/424.1 |
| 5,272,630 | 12/1993 | Brown et al. | 364/424.1 |
| 5,303,616 | 4/1994 | Palansky et al. | 74/890 |
| 5,305,663 | 4/1994 | Leonard et al. | 74/866 |
| 5,315,901 | 5/1994 | Barnes | 192/3.3 |

*Primary Examiner*—Collin W. Park
*Attorney, Agent, or Firm*—Frank G. McKenzie; Roger L. May

[57] ABSTRACT

A multiple ratio transmission for an automotive vehicle comprising a main gear unit with at least three ratios and an overdrive gear unit with a direct drive ratio and an overdrive ratio, and a control valve system that will permit upshifting and downshifting of the overdrive gear unit while inhibiting ratio changes in said main gear unit from either a second ratio manual drive mode or from a third ratio manual drive mode.

4 Claims, 20 Drawing Sheets

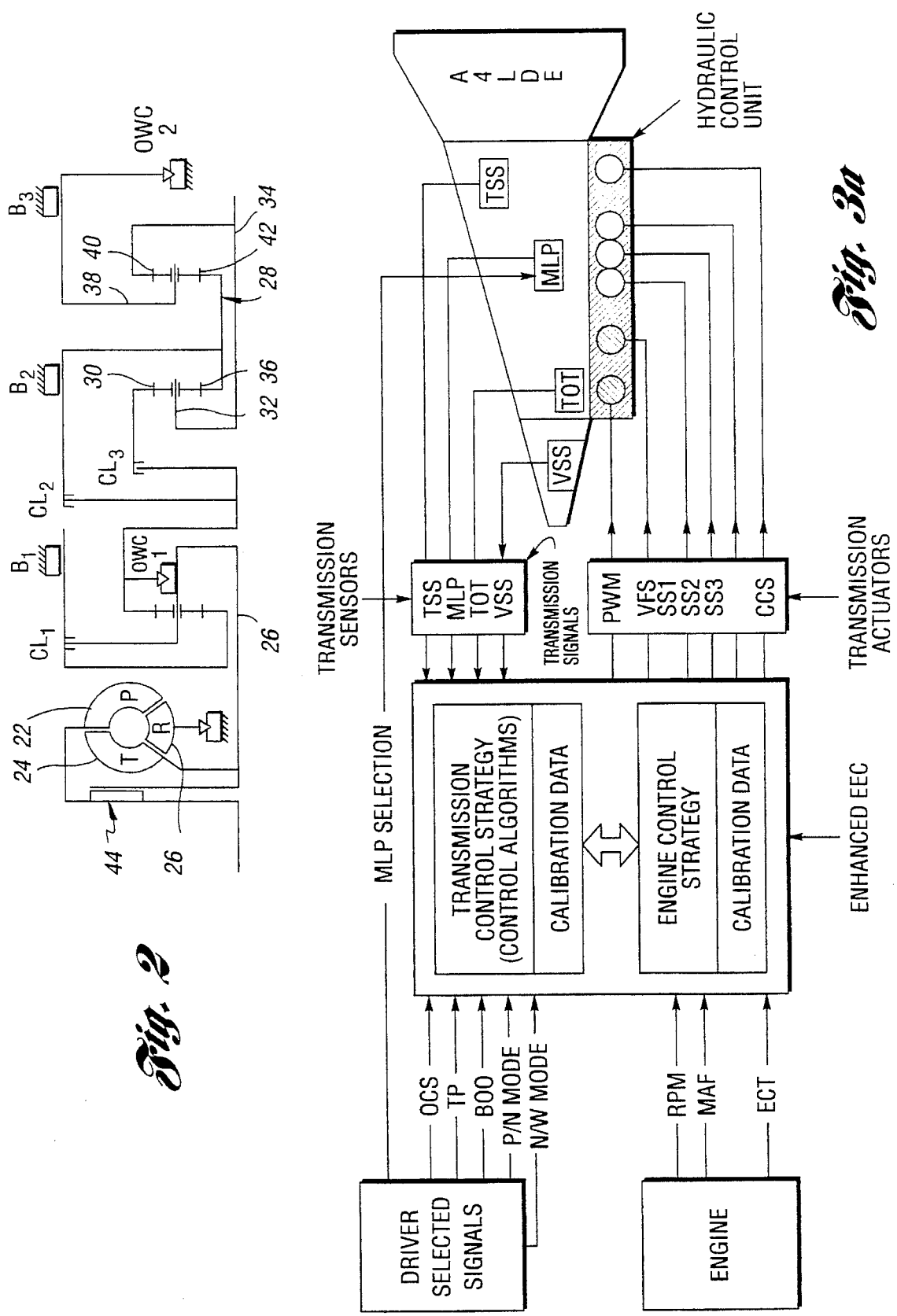

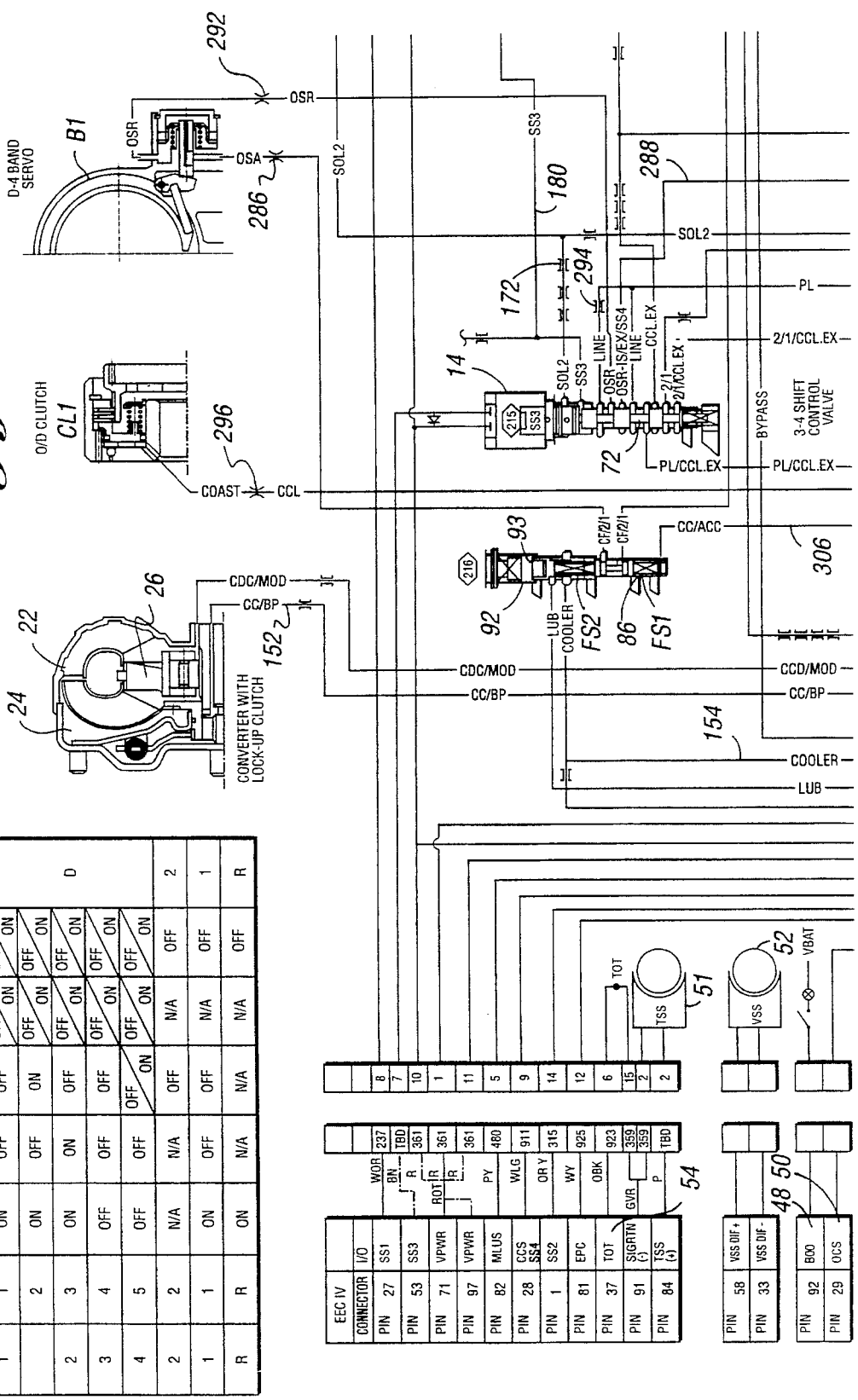

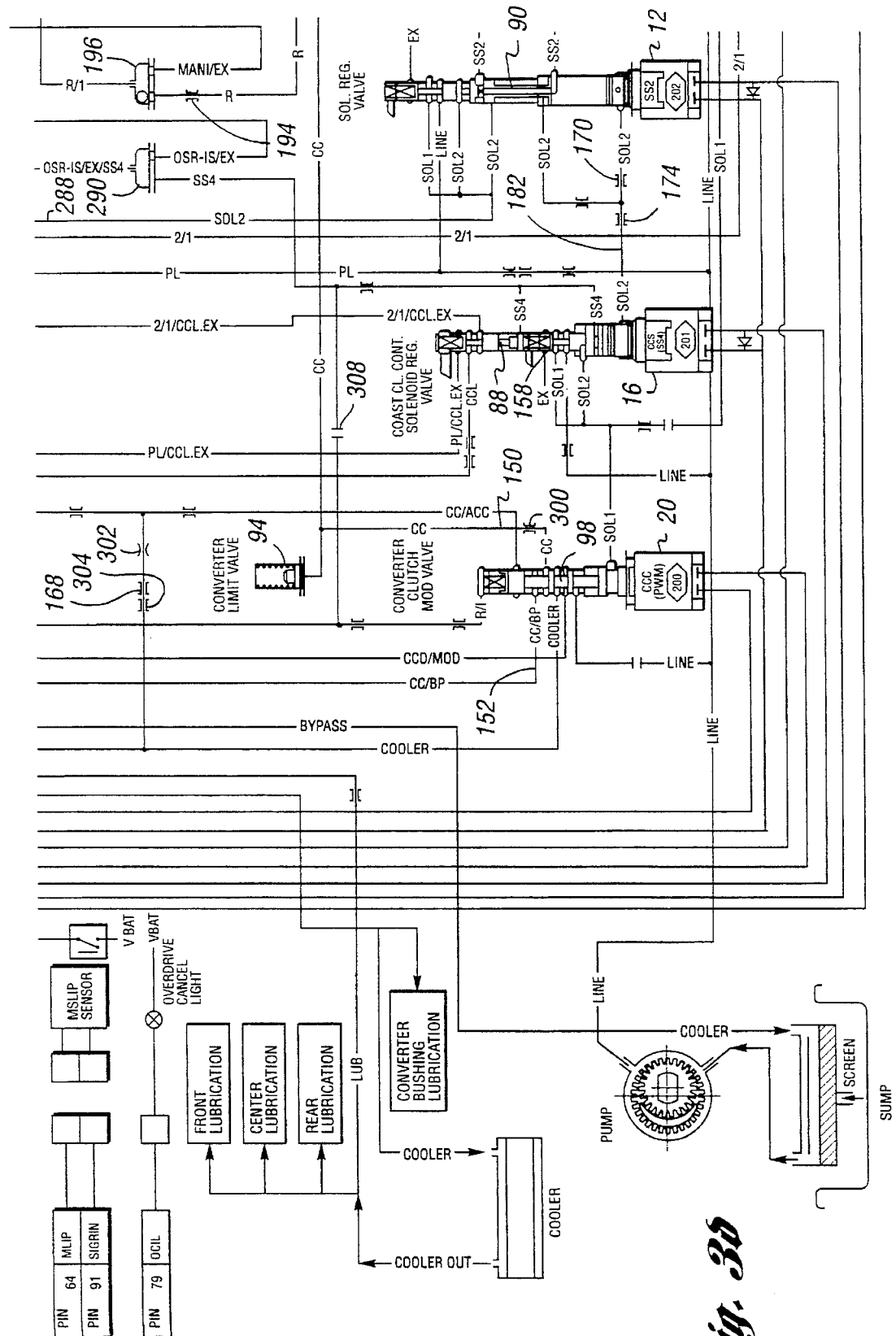

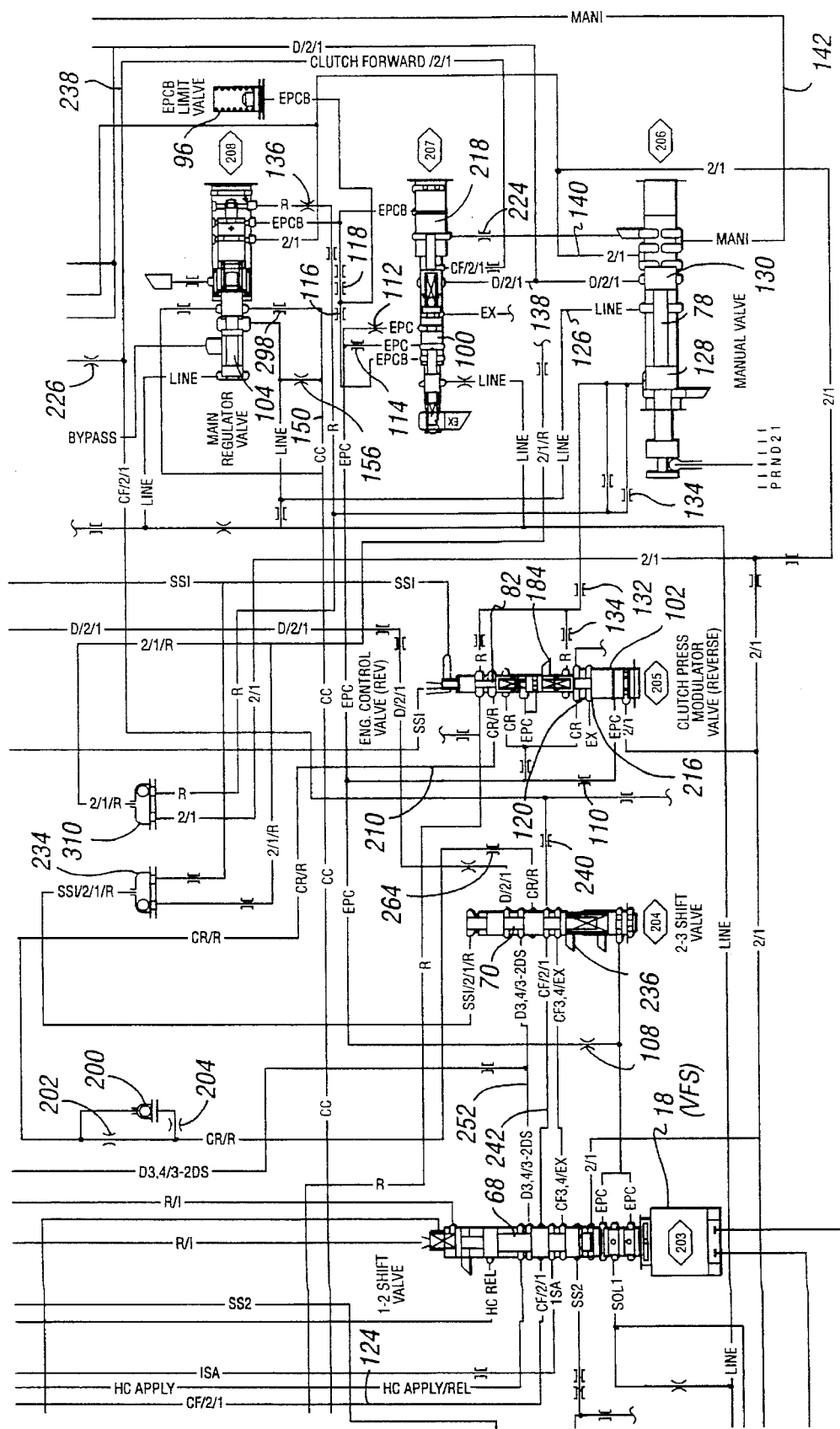

| MANUAL LEVER POSITION | | FRICTION AND REACTION ELEMENTS | | | | | | | | | SHIFT SOLENOID STAGES | | | | |
|---|---|---|---|---|---|---|---|---|---|---|---|---|---|---|---|
| | | CL1 | B1 | OWC1 | CL2 | B2 | CL3 | B3 | OWC2 | CC | SS1 | SS2 | SS3 | SS4 | PWM |
| P | PARK | | | | | | | | | | ▨ | | | | |
| R | REVERSE | | | | ▨ | | | ▨ | | | ▨ | | | | |
| N | NEUTRAL | | | | | | | | | | ▨ | | | | |
| D | DRIVE 1st | ◪ | | ▨ | | | | | | | ▨ | | | | |
| | 2nd | ◪ | | ▨ | | ▨ | | | | | ▨ | ▨ | | | ◪ |
| | IS1 | ◪ | | ▨ | | ▨ | | | | ◪ | ▨ | ▨ | | ◪ | ◪ |
| | IS2 | ◪ | | ▨ | | ▨ | | | | ◪ | ▨ | ▨ | | ◪ | ◪ |
| | 3rd ODC SWITCH = OFF | | | ▨ | | ▨ | ▨ | | ▨ | ◪ | ▨ | ▨ | ▨ | | ◪ |
| | 3rd ODC SWITCH = ON | | | ▨ | | ▨ | ▨ | | ▨ | ◪ | | ▨ | ▨ | | ◪ |
| | 4TH | | ▨ | | | ▨ | ▨ | | ▨ | ◪ | | | ▨ | | ◪ |
| 2 | 2nd +OD | | | ▨ | | ▨ | ▨ | | | ◪ | ▨ | | ▨ | | ◪ |
| | 2nd ✶ | | | ▨ | | ▨ | ▨ | | | ◪ | ▨ | | ▨ | | ◪ |
| 1 | 2nd +OD | | | ▨ | | ▨ | ▨ | | | | ▨ | | | | ◪ |
| | 2nd | | | ▨ | | ▨ | | | | | ▨ | | | | |
| | 1st | | | ▨ | | | | ▨ | | | ▨ | | | | |

SHIFT SOLENOID = ENERGIZED OR CLUTCH ENGAGED

☐ = SHIFT SOLENOID IS DE-ENERGIZED OR CLUTCH IS RELEASED

◪ = CLUTCH OR SOLENOID CAN BE ENERGIZED OR DE-ENERGIZED DEPENDING ON VEHICLE

✶ = HYDRAULIC LOCKED

Fig. 3f

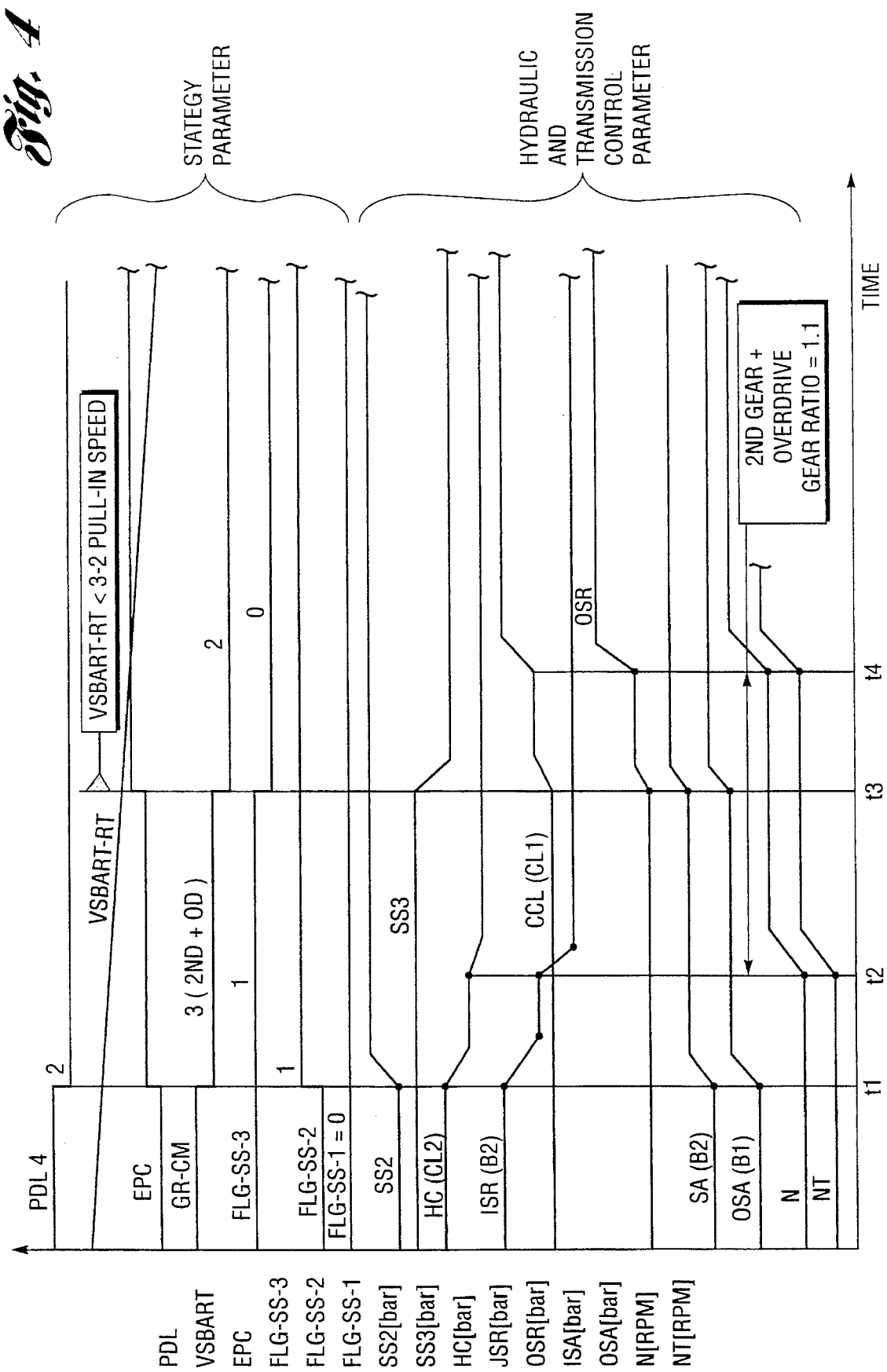

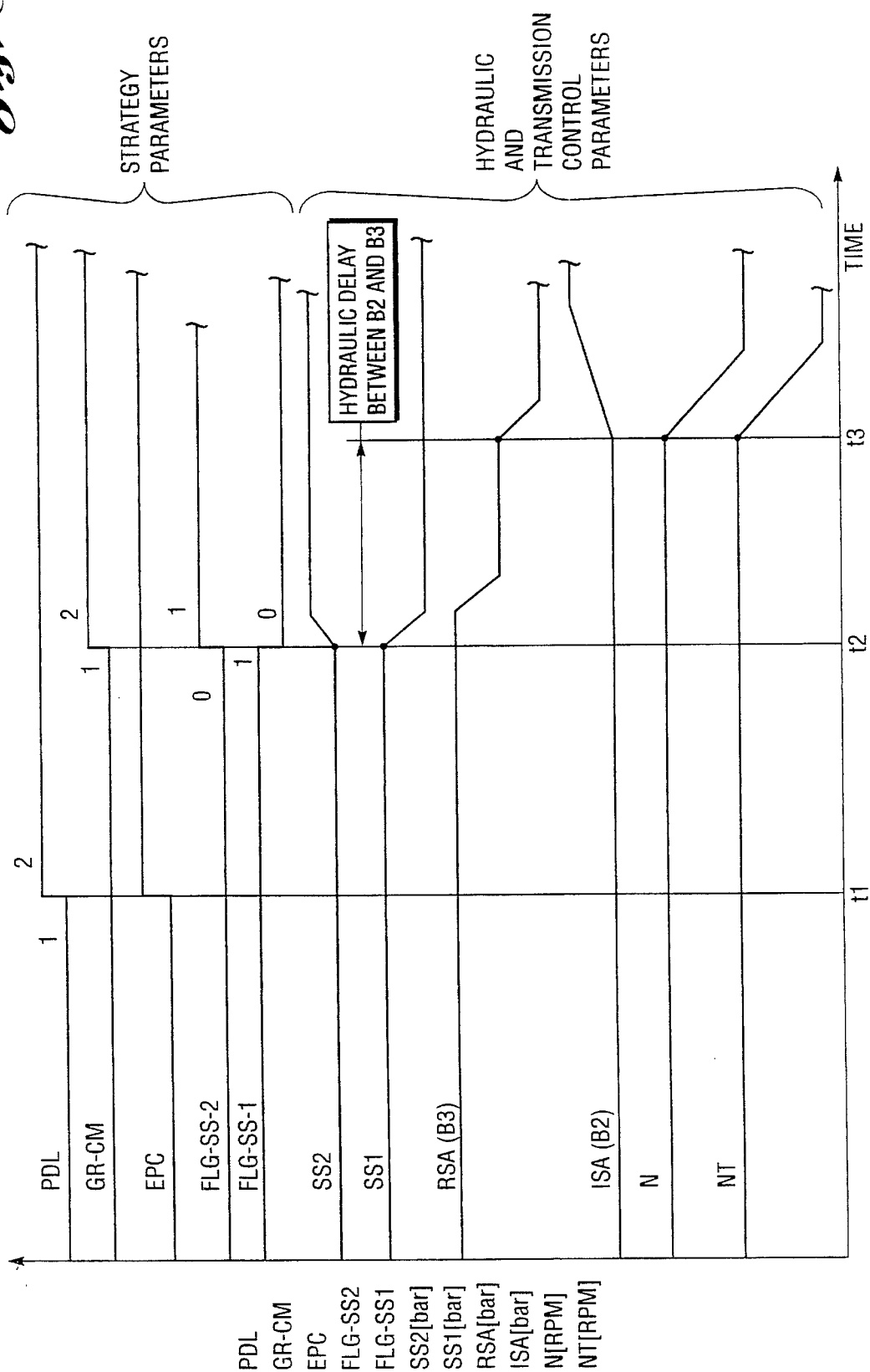

SHIFT CONTROL SYSTEM FOR A MULTIPLE RATIO AUTOMATIC TRANSMISSION WITH MANUAL RATIO RANGES

CROSS-REFERENCE TO RELATED APPLICATIONS

This invention is a division of U.S. patent application Ser. No. 08/323,464, filed Oct. 14, 1994, entitled "Multiple Ratio Automatic Transmission And Control System". It is related to U.S. patent application Ser. No. 08/434,235, filed May 4, 1995, entitled "Multiple Ratio Automatic Transmission And Control System", to U.S. patent application Ser. No. 08/526,457, filed Sep. 11, 1995, entitled "Multiple Ratio Automatic Transmission and Torque Converter", and to U.S. patent application Ser. No. 08/509,571, filed Jul. 31, 1995, entitled "Shift Control System For A Multiple Ratio Automatic Transmission". These applications are assigned to the assignee of the present invention and are hereby incorporated by reference.

TECHNICAL FIELD

The invention relates to multiple ratio transmissions for automotive vehicles and to electronic-hydraulic controls for effecting automatic ratio changes.

BACKGROUND AND SUMMARY OF THE INVENTION

Our invention is adapted to be used in a multiple ratio planetary transmission situated in a vehicle driveline having an internal combustion engine with a throttle control and a hydrokinetic torque converter situated between the engine and input elements of the gearing.

The gearing comprises two simple planetary gear units arranged in a manner similar to the gearing arrangement of the well-known Simpson gear set. Located between the turbine of the torque converter and the input elements of the Simpson gearing is a third simple planetary gear unit with a friction clutch adapted to connect two elements of the third gear unit together for rotation in unison. A friction brake also is used for anchoring a reaction element of the third planetary gear unit. An overrunning coupling establishes one-way torque flow between two elements of the gearing. The brake is arranged in series relationship with respect to the clutch.

A second overrunning coupling in a gear unit of the Simpson gearing is used for the purpose of establishing non-synchronous ratio shifts. Forward engagement is achieved by engaging a forward clutch on a shift from neutral to a drive state. Similarly, a separate reverse engagement clutch is used to establish a torque flow path for reverse. In each instance, turbine speed is used as a feedback signal to initiate the start of the forward or reverse engagement.

The control system of the invention is capable of providing 3–2 downshifts and 2–1 downshifts using a strategy that is vehicle speed dependent when the operator chooses a manual lever position requiring engine braking in each gear. Downshift points always will occur at the same vehicle speed.

A 2–1 shift inhibiting function may provide control ratio steps, for example, from 1.474 to 2.474. The second ratio can be hydraulically locked in second gear when the driver locks the transmission in manual 2 condition. This will permit a so-called "limp home" capability when the transmission electronics fail. Upshifting and downshifting of the overdrive gear unit is permitted when the transmission operates in the manual 2 condition. This allows a 3–2 inhibition function, engaging or disengaging the overdrive gear unit. The two gear ratio step here, for example, may be 0.75×1.44 (1.1) to 1.44.

Provision is made for mutually exclusive control of the low ratio brake and the intermediate ratio brake while preventing a planetary gear tie-up because of simultaneous engagement of these brakes. No additional shift valves are required in the control system to accomplish this feature.

Automatic shifts of the overdrive gear unit during manual operation will enhance fuel economy, improve noise level and permit lower engine speeds when engine braking.

BRIEF DESCRIPTION OF THE DRAWINGS

FIG. 2 is a schematic representation of the gearing elements of FIG. 1;

FIG. 3a is a schematic representation of the overall signal flow path for the electronic controller as the transmission control strategy executes control algorithms based on input information from the driver, the transmission, and from the engine itself;

FIGS. 3b–3e is a schematic valve diagram of the control system;

FIG. 3f is a chart showing the clutch and brake application and release pattern for the various ratios of the gearing of FIGS. 1 and 2;

FIG. 4 is a timing diagram for the gearing when the manual valve is in the "2" manual valve position indicating a 3–2 shift inhibiting function;

FIG. 8 is a timing diagram for a manual 1–2 upshift with "power on";

PARTICULAR DESCRIPTION OF THE INVENTION

General Overview

The electronic control system for the transmission of our invention is a hybrid system wherein solenoids, actuated by an electronic microprocessor, control gear selection, converter clutch operation and system pressure buildup. The friction elements (bands and clutches) are applied and released by hydraulic pressure determined by a hydraulic control unit (main control assembly). This hydraulic control unit contains 4 shift solenoids, shift valves, one variable force solenoid, one PWM-solenoid and pressure modulator valves.

The transmission control strategy is based on various signal inputs generated from the driver, engine and transmission, for each operating condition. FIG. 3a shows a signal flow overview for the transmission. The following signals, as seen in FIG. 3a, are used during execution of the transmission control strategy:

A) Driver
OCS, TP, BOO, P/N Mode, N/W Mode
B) Transmission:
VSS, TSS, MLP, TOT
C) Engine:
N, MAF, ECT.

Figure 1:
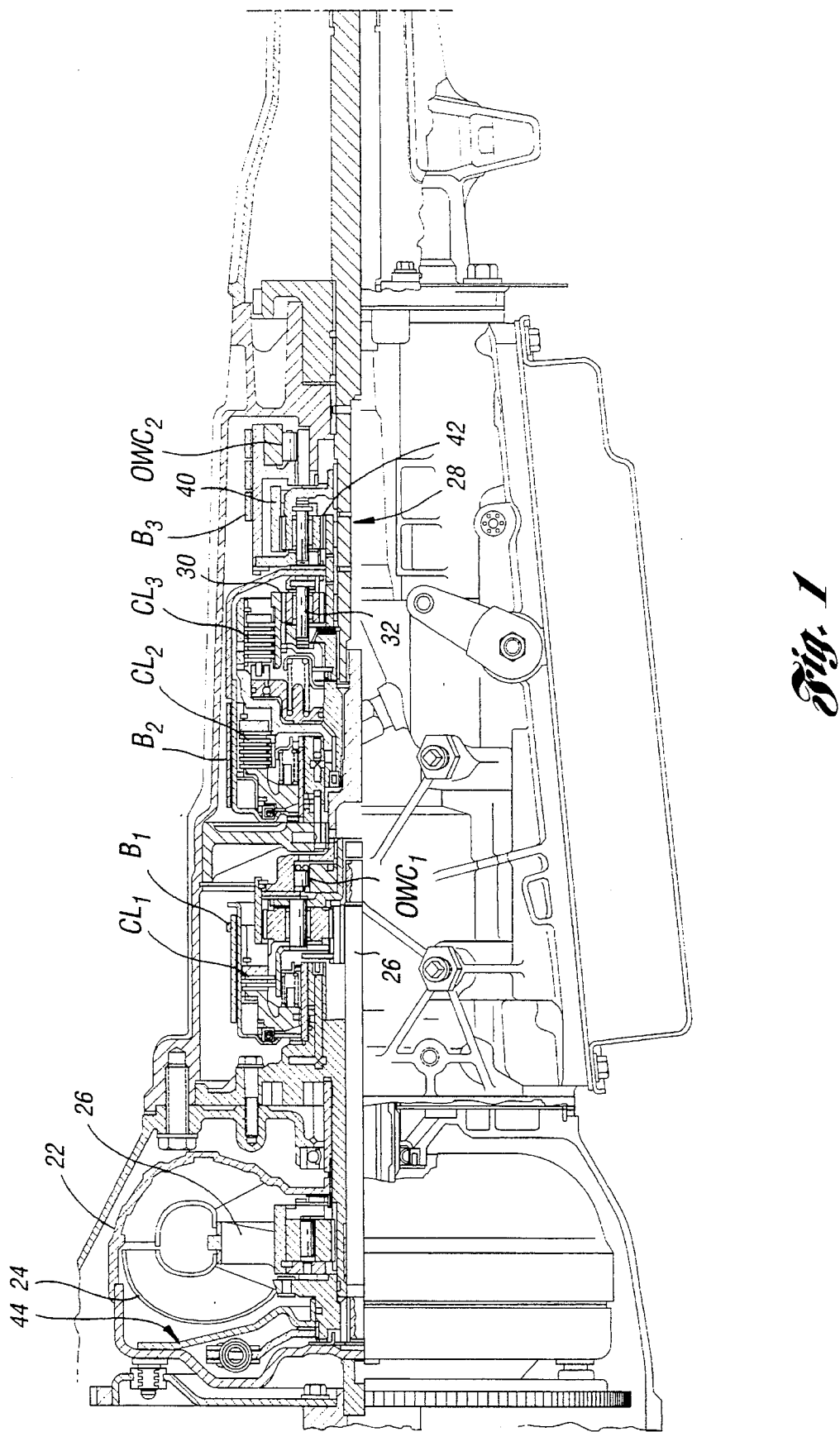
FIG. 1 is a cross-sectional view of a geared planetary transmission adapted to be controlled by our improved control system.
Figure 3C:
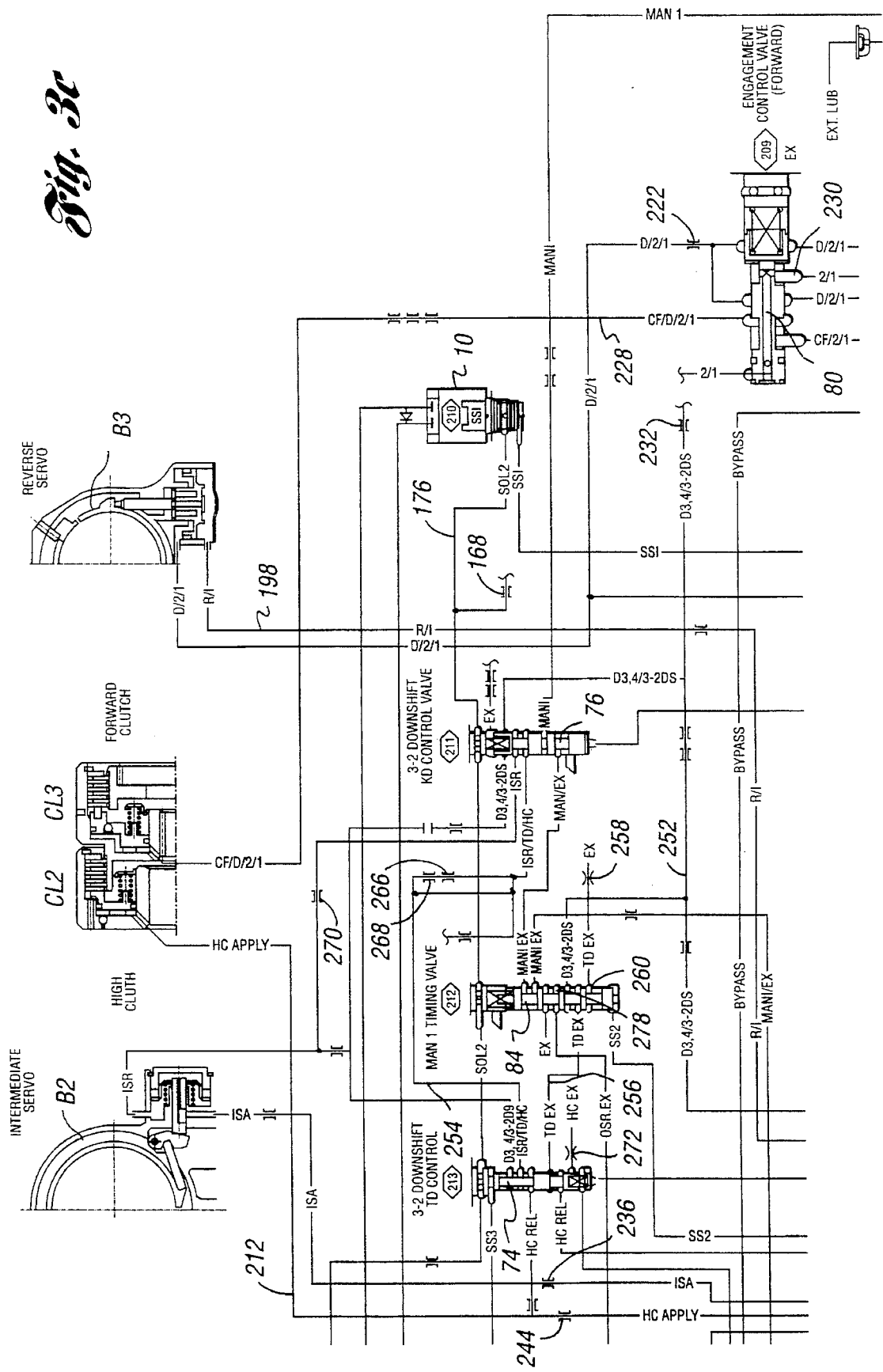

The control algorithms of the transmission strategy are executed based on the input signals and calibration data during transmission operation. The transmission operation is basically broken down in the following three major events:

1) shifting event
2) clutching capacity determination
3) converter clutch control The following actuators are responsible for execution of these operating events:

4 ON/OFF solenoids for shifts (SS1–SS4), as seen at 10 in FIG. 3c, 12 in FIG. 3d, 14 in FIG. 3b and 16 in FIG. 3d,
1 VFS for clutch capacity, as seen at 18 in FIG. 3e,
1 PWM solenoid for converter clutch control, as seen at 20 in FIG. 3d.

The transmission actuators convert electrical signals generated by the control algorithms into either a hydraulic signal pressure or pressures directly applied to clutches or bands. An assembly of shift and modulator valves are actuated by these signal pressures. Shift valves effect release or application of hydraulic pressure to the torque transmitting elements (clutches and bands). Pressure modulator valves adjust the amount of clutch or brake capacity of the friction elements.

Transmission Hardware Overview

Transmission Torque Flow

The gear set arrangement contains an overdrive planetary gear see connected in series to a Simpson set. FIG. 1 shows the various clutches and bands with conventional abbreviations. FIG. 2 shows, in schematic form, the torque flow paths for the transmission. The clutch and brake engagement and release pattern to effect ratio changes are shown in FIG. 3f.

Torque Flow First Gear In DRIVE

The engine torque is transmitted to the housing of the torque converter pump or impeller as shown at 22 in FIGS. 1 and 2. The converter impeller is a centrifugal pump which accelerates the fluid inside of the torque converter towards the turbine blades. The accelerated oil is then decelerated over the turbine blades and the oil at the turbine exit is redirected over the reactor back into the impeller, thereby achieving a torque multiplication effect.

From the input shaft 26, the torque is transmitted to OWC1, which effects a torque reaction in the rotational direction of the engine and overruns in the opposite direction. The engaged clutch CL3 carries torque from the center shaft to the front part of the planetary gear arrangement of the Simpson set 28.

The torque is delivered to the ring gear and is then split into two components. One part is delivered over the planetary carrier to the output shaft 34, which turns in the same rotational direction as the ring gear 30. The sun gear 36 carries the remaining part of the torque in the opposite direction to the rear gear set of the Simpson planetary gear set. The planetary carrier 38 of the rear planetary gear see is held by OWC2. The torque delivered to the sun gear is then transmitted over the planetaries to the ring gear 40, which reduces the velocity and multiplies the torque to the output shaft. This arrangement provides a 2.474 gear ratio.

In coast mode, OWC1 and OWC2 overrun and free wheeling is in effect. The converter clutch stays open until no torque multiplication occurs. It then can be locked afterwards.

Torque Flow: Second Gear In DRIVE

The torque flow is the same as in first gear except that B2 is applied, as seen in FIG. 2. With the engagement of B2, the speed of sun gear 42 is reduced to zero speed. Here, the brake band (B2) serves as a reaction element for the front planetary gear set and generates an output torque multiplication of 1.474 by holding 0.474 times engine torque as a reaction to the output. The output of the rear planetary gearset is zero since the sun gear has zero speed (see FIG. 2). The converter clutch 44 can be locked or unlocked in second gear depending on the driving condition.

Torque Flow Third Gear In DRIVE, Overdrive Cancel Switch=OFF

In third gear, B2 is released and CL2 is applied. The transition from second to third gear must be synchronized since no reaction element is available to hold the CL2 drum when B2 is released. The converter clutch can be locked or unlocked depending on the driving condition. The torque input to CL2 and CL3 is split depending on the gear ratio. CL2 carries 0.321 times engine torque and CL3 carries 0.679 times engine torque. The torque flow to CL2 is the same as in first or second gear.

With the overdrive cancel switch turned off, the coast clutch (CL1) is disengaged, i.e., electronically released, and free wheeling takes place since OWC1 overruns in coast mode (see FIG. 2). This is the direct gear with a gear ratio of one. Since the gear change from second to third and from third to second has to be synchronized.

Torque Flow Third Gear in DRIVE, Overdrive Cancel Switch=ON

When the overdrive cancel switch is ON, CL1 is hydraulically applied and engine braking takes place in coast mode. CL1 is electronically controlled and hydraulically actuated along with B1 (see FIG. 2).

Torque Flow Fourth Gear In DRIVE

In fourth gear, B1 is applied and carries –0.25 times engine torque as a reaction to the output. B1 decelerates the sun gear of the overdrive planetary gear set to zero speed and generates an 0.75 gear ratio. An engagement of CL1 is hydraulically inhibited and OWC1 overruns. Since B1 carries 0.25 times engine torque and since the overdrive planetary gear set is an input to the Simpson set, CL2 and CL3 hold three-quarters of total engine torque. The gear ratio is 0.75. The converter clutch can be locked or unlocked based on the driving condition (see FIG. 2.)

Torque Flow First Gear In MANUAL Position

In MANUAL1, the torque flow is the same as in first gear in drive position except B3 and CL1 are applied, as seen in FIG. 8, to generate engine braking in coast mode. The converter clutch is hydraulically inhibited and cannot be applied electronically. B3 prevents overrunning of OWC2, and CL1 prevents overrunning of OWC1. The gear ratio is 2.474 (see FIG. 2).

Torque Flow: Second Gear In MANUAL2 Position

In MANUAL2, the torque flow is the same as in second gear in drive position except CL1 is applied to achieve engine braking in coast mode. CL1 prevents overrunning of OWC1 in power OFF condition. The converter clutch 44 can be applied depending on the operating condition. The gear ratio is 1,474.

Torque Flow: Second Gear Plus Overdrive In MANUAL2 Position

The torque flow here is the same as for second gear except B1 is applied. With the engagement of B1, CL1 is hydraulically released and the gear ratio of 1.1 is accomplished. B1 is not hydraulically locked in MANUAL2 position and can be applied and released electronically. This shift arrangement is mainly used for 3–2 inhibition function during MANUAL downshifts.

Torque Flow: REVERSE Position

In REVERSE, torque is delivered over OWC1 and CL2 to the sun gear of the rear planetary gear set. B3 holds the reaction torque, which is −3.11*input torque. With the input through the sun gear and by holding the carrier with B3, the rotational direction of the output ring gear is reversed. The ratio is 2.11. CL1 is not applied in reverse which gives free wheeling in coast mode, allowing OWC1 to overrun. Disconnection of CL1 is required in order to eliminate the hydraulic delay associated with the engagement of CL2 during a static engagement of CL2 and B3. The function during reverse position is to synchronize the engagement of CL2 and B2 during the static engagement event.

Electronic-Mechanical Interface

FIG. 8 shows the functional matrix of the transmission. This functional matrix represents the active solenoid stages dedicated to the gears and the manual lever positions. The significance of this matrix is shown by solenoid stages used in "DRIVE" position.

Manual Lever Position: DRIVE

First of all, when the overdrive cancel switch 50, shown in FIG. 3b, is turned on or off, CL1 is applied or released. With ODC=ON, CL1 is applied and the fourth gear is electronically inhibited with engine braking in third gear. For this operation, one single solenoid only has to be dedicated, which is SS4.

For the remaining electronic-mechanical interface, the following facts have to be considered:

A) One solenoid stage is needed for each gear (1st, 2nd, 3rd and 4th).

B) There are two intermediate stages (IS1, IS2), which are used for controlling the synchronous 3–2/4–2 downshifts.

C) One of the intermediate steps (IS1) is used for the synchronization of the 2–3 upshifts.

Hence, seven solenoid stages are required. In order to realize seven solenoid stages, three ON/OFF solenoids are needed. The ON/OFF solenoids are SS1, SS2, and SS3, as seen in FIGS. 3b–3e.

The PWM-solenoid 20 in FIG. 3d is dedicated, independently, to the shift solenoids, for converter clutch control and can be actuated in each gear in MAN2 and DRIVE position. With the solenoid configuration shown in FIG. 8, the gear selection and gear changes as described above are realized.

The hydraulic control system of FIGS. 3b–3e is designed according to the above described electronic-mechanical configuration.

Manual Lever Position: MAN1/MAN2

In MAN2 position, two different gear selections are possible; i.e., second gear and second gear plus overdrive. Second gear is hydraulically locked and is independent of the solenoid stages in first and second gear. Second gear plus overdrive is electronically controlled. B1 can be applied or released with SS3, shown at 14 in FIG. 3b.

In MAN1 position, all shown gears (1st, 2nd and 2nd+OD) are electronically controlled. Due to hydraulic design requirements, the solenoid stage in second gear is different than the second gear stage in DRIVE position. The solenoid stage for second gear+OD is the same as in MAN2 position.

The additional solenoid stages and gear selections are needed to achieve an electronically controlled 3–2 inhibition function in MAN2 and a 3–2/2–1 inhibition function in MAN1 position with engine braking in each gear.

Manual Lever Position: PARK, REVERSE, NEUTRAL

In PARK, REVERSE and NEUTRAL position, only one solenoid stage is used, which is the first gear state. This solenoid stage is used also for static engagement control into PARK and REVERSE. The layout of the engagement control system is therefore designed without the requirement for changing solenoid stages. This simplifies the hydraulic control system significantly for static reverse and forward engagements.

Sensors And Actuators

There is a distinction between driver actuated sensors and sensors which determine the transmission status. The signals are used by the control algorithms in the EEC module for decision making. Based on the signals, the control algorithms decide how the transmission actuators are applied to achieve the desired operating mode of the transmission. Further, several engine sensors are used for determining several input parameters for the transmission, such as the engine speed (RPM), engine torque (MAF) and engine coolant temperature (TOT), as seen in FIGS. 3a and 3b.

Driver Actuated Sensors

Manual Lever Position Sensor (MLP)

The manual lever position (MLP) sensor is mounted on the outside of the transmission. It determines the neutral/park start switch function and senses the lever position using a resistance network (see FIG. 3a). The neutral start switch function allows the engine to start only in neutral or park position. The resistance network is responsible for sensing the selection of the lever position, which is actuated by a mechanical linkage.

The transmission contains six lever positions. The seventh position is the overdrive position, which is canceled or enabled by the overdrive cancel switch. The control strategy is loaded in a register called PDL with a number 1 through 7, depending on the manual lever position and the state of the overdrive cancel switch. The following chart illustrates this:

| Manual Lever Position (6 position) | State of Overdrive Cancel Switch | Value of PDL REGISTER |
|---|---|---|
| PARK | — | 7 |
| REVERSE | — | 6 |
| NEUTRAL | — | 5 |
| DRIVE | OFF | 4 |
| DRIVE | ON | 3 |
| MANUAL2 | — | 2 |
| MANUAL1 | — | 1 |

The following control strategies use the MLP signal:
Distinguishing between automatic and manual control algorithms,
Static engagement control system,
Manual upshifts and downshifts.

The hydraulic control system is packaged in a main control assembly consisting of:
valve body with 16 valve bores numbered from 200 to 216 including a connecting labyrinth
4 ON/OFF solenoids 10, 12, 14 and 16
1 Variable Force Solenoid 18
1 PWM-solenoid 20
11 shift valves 68, 70, 72, 74, 76, 80, 82, 84, 88, 90 and 98
1 accumulator valve 86
1 thermostat valve 92
2 blow off valves 94, 96
3 modulator valves 218, 100, 102
1 main regulator valve including a booster valve 104
1 manual valve 78
18 sleeves and retainer
21 springs
2 brackets to hold the solenoids
separator plate which separates the valve body labyrinth from the case labyrinth by connecting holes
upper and lower gaskets.

FIGS. 3b–3e show the following components: for pressure buildup:
clutch pressure modulator (forward) 218 in bore 207,
EPCB valve 100 in bore 207,
main regulator system 104 in bore 208,
VFS 18 in bore 203,
for shift execution:
shift solenoid 1, shown at 10, in bore 210,
shift solenoid 2, shown at 12, in bore 202,
2–3 upshift control valve 70 in bore 204,
1–2 upshift control valve 68 in bore 203,
MAN1 timing valve 84 in bore 212,
3–2 downshift KD control valve 76 in bore 211,
3–2 downshift TD control valve 74.
shift solenoid 3, shown at 14 in bore 215,
shift solenoid 4, shown at 16 in bore 201.

The manual shift functions of the control system now will be described.

Manual Shift Control System

Described is the shift control system when the manual lever is in MANUAL1 or MANUAL2 position. The manual functions, which are executed in the manual ½ positions, are the 3–2 inhibition function and the 2–1 inhibition function. The inhibition functions are implemented to provide a continuous downshift sequence with engine braking in coast mode. During a 3–2 inhibition the gear change is from second gear plus overdrive to second, and is executed in MAN2 and MAN1 position. The 2–1 inhibition is the gear change from second to first. In MAN1 position the 3–2 inhibition function, as well as the 2–1 inhibition function, is executed. When the transmission has shifted into one of these gears, the transmission stays in that particular gear. The 3–2 inhibition and 2–1 inhibition are executed depending in a vehicle speed threshold and depending on the manual lever position.

Depending on the position of the manual valve in bore 206, the following pressures are derived from line pressure in the manual positions:

| Pos. MAN2: | 2 and D/2 |
|---|---|
| Pos. MAN1: | D/2/1 and 2/1 and MAN1 |

Derived from these manual lever dependant pressures, the following pressures are generated by two-way shuttle ball check valves:

| Check - ball valve 310: (see FIG. 3e) | 2/1/R |
|---|---|
| Check - ball valve 234: (see FIG. 3e) | SS1/2/1/R |
| Check - ball valve 196: (see FIG. 3d) | 1/R |

These pressures are used to override the shift valves actuated by pressures other than MAN1 or MAN2 pressures.

The following hardware components are involved in MANUAL shifts:
Pressure build up:
CF modulator 218 in bore 207
main regulator system 104 in bore 208
VFS 18 in bore 203
EPCB valve system 100 in bore 207
Solenoids and shift valves:
SS1 shift solenoid 10
SS2 shift solenoid 12
SS3 shift solenoid 14
2–3 shift valve 70 in bore 204
3–4 upshift valve 72 in bore 215 (FIG. 3b)

3–2 downshift td control valve 74 in bore 213 (FIG. 3c)

MAN1 timing valve 84 in bore 212 (FIG. 3c)

3–2 downshift kd control valve 76 in bore 211 (FIG. 3c)

coast clutch control valve 88 in bore 201 (FIG. 3d)

1–2 upshift valve 68 in bore 203

Figure 5A:
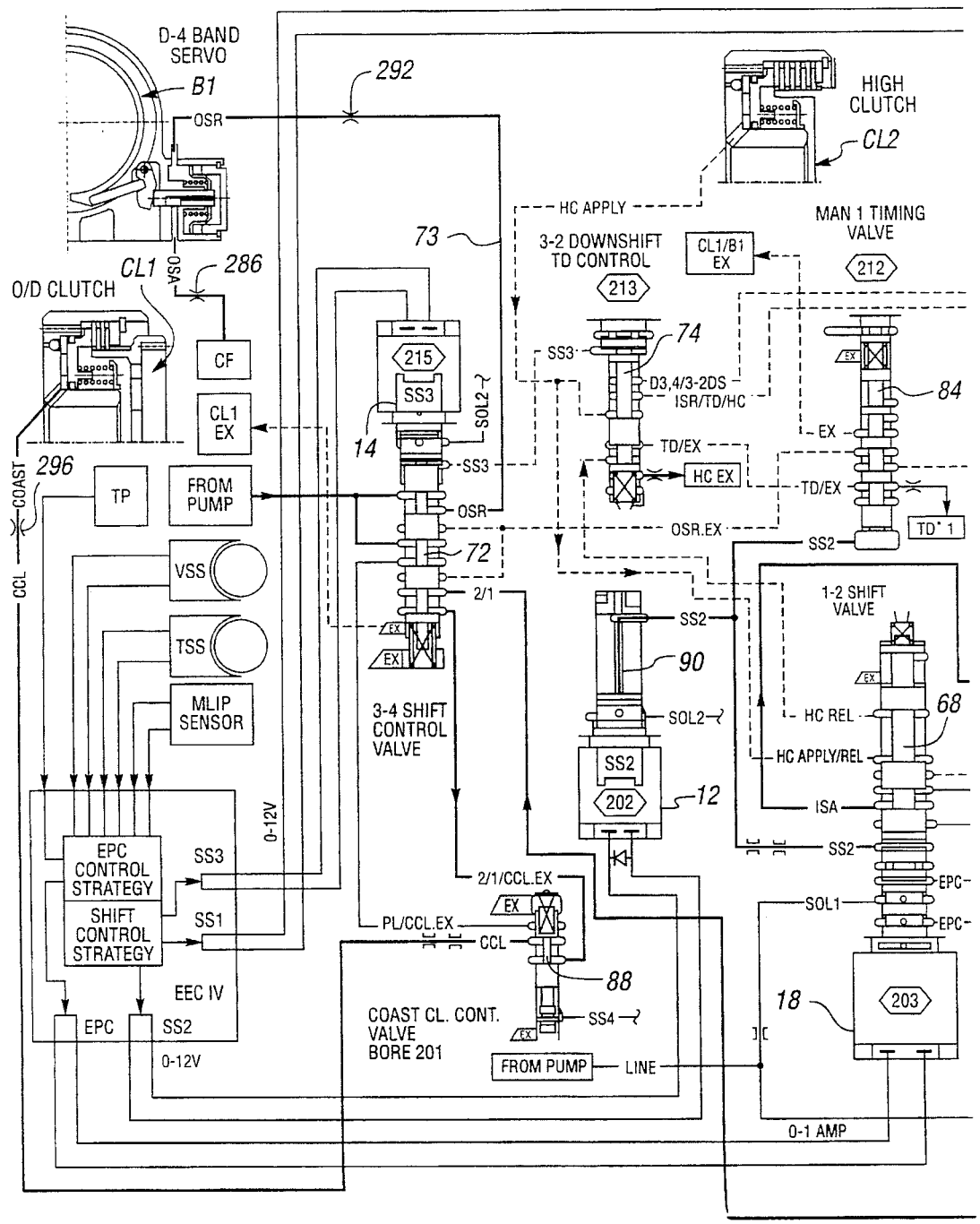
FIGS. 5a and 5b are a control valve circuit diagram showing the valve positions during operation with the manual valve in the 2 position during second gear operation.
Figure 5B:
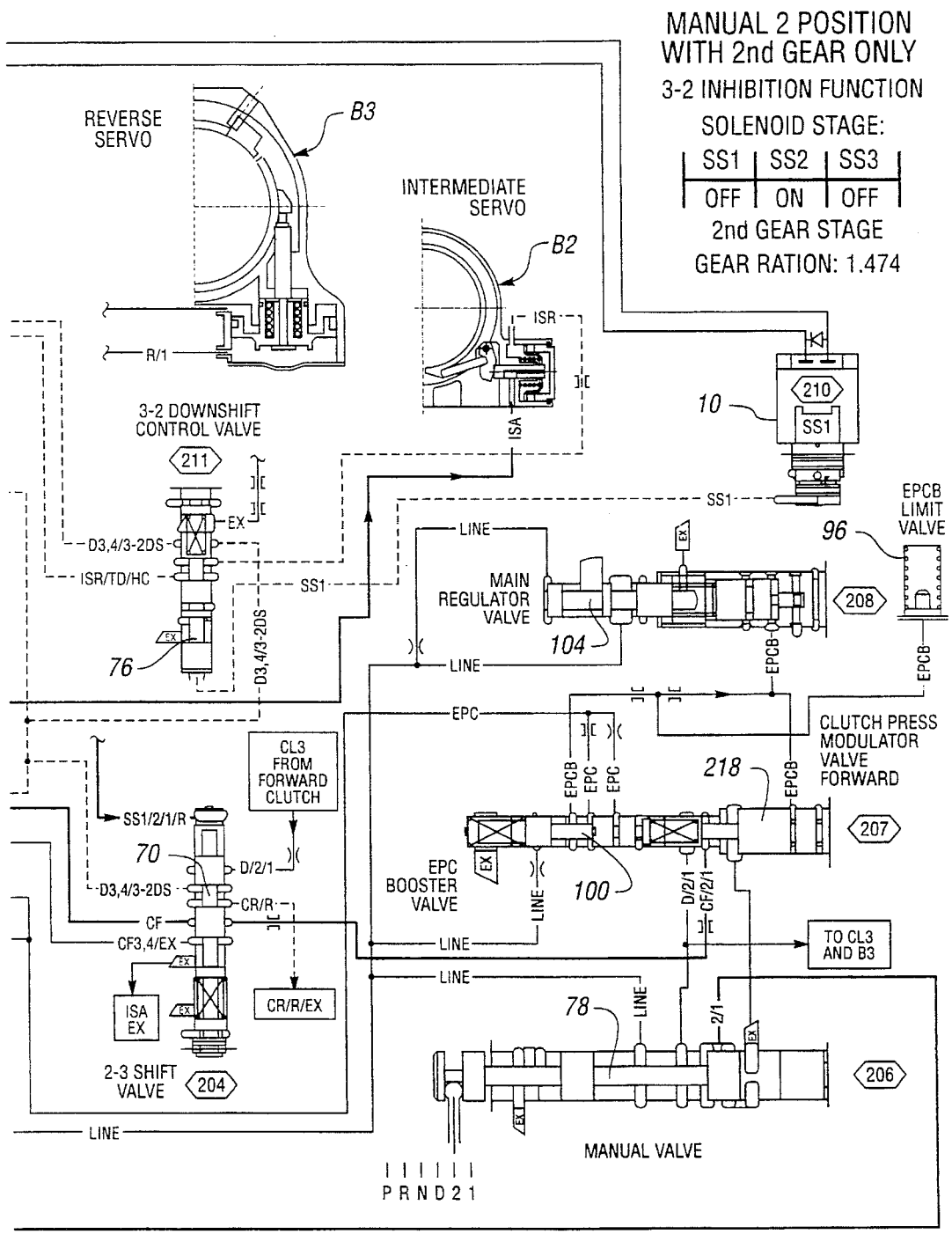
Figure 6A:
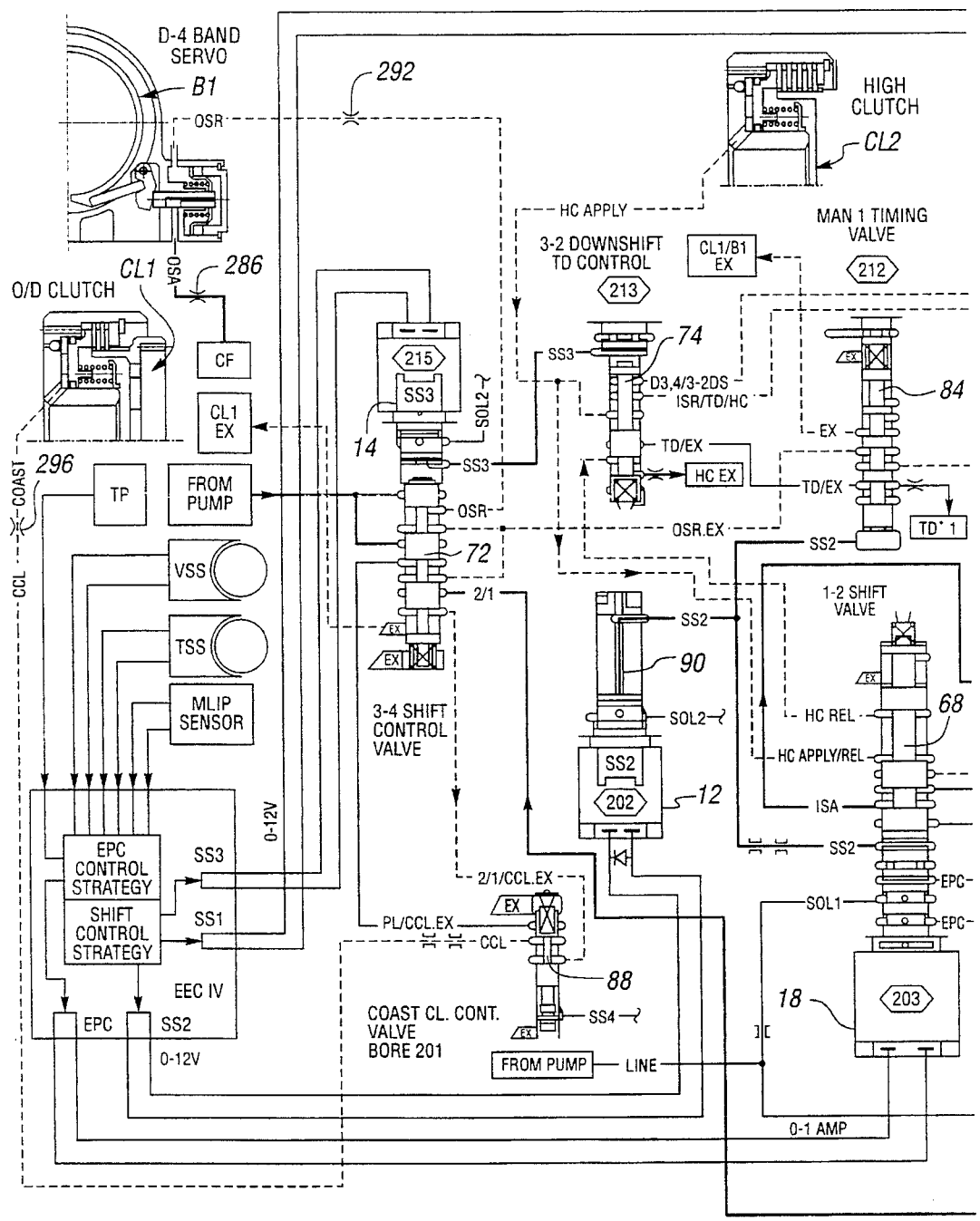
FIGS. 6a and 6b are a control valve circuit diagram showing the valve positions with the manual valve in the "2" position and the gearing in second gear plus overdrive.
Figure 6B:
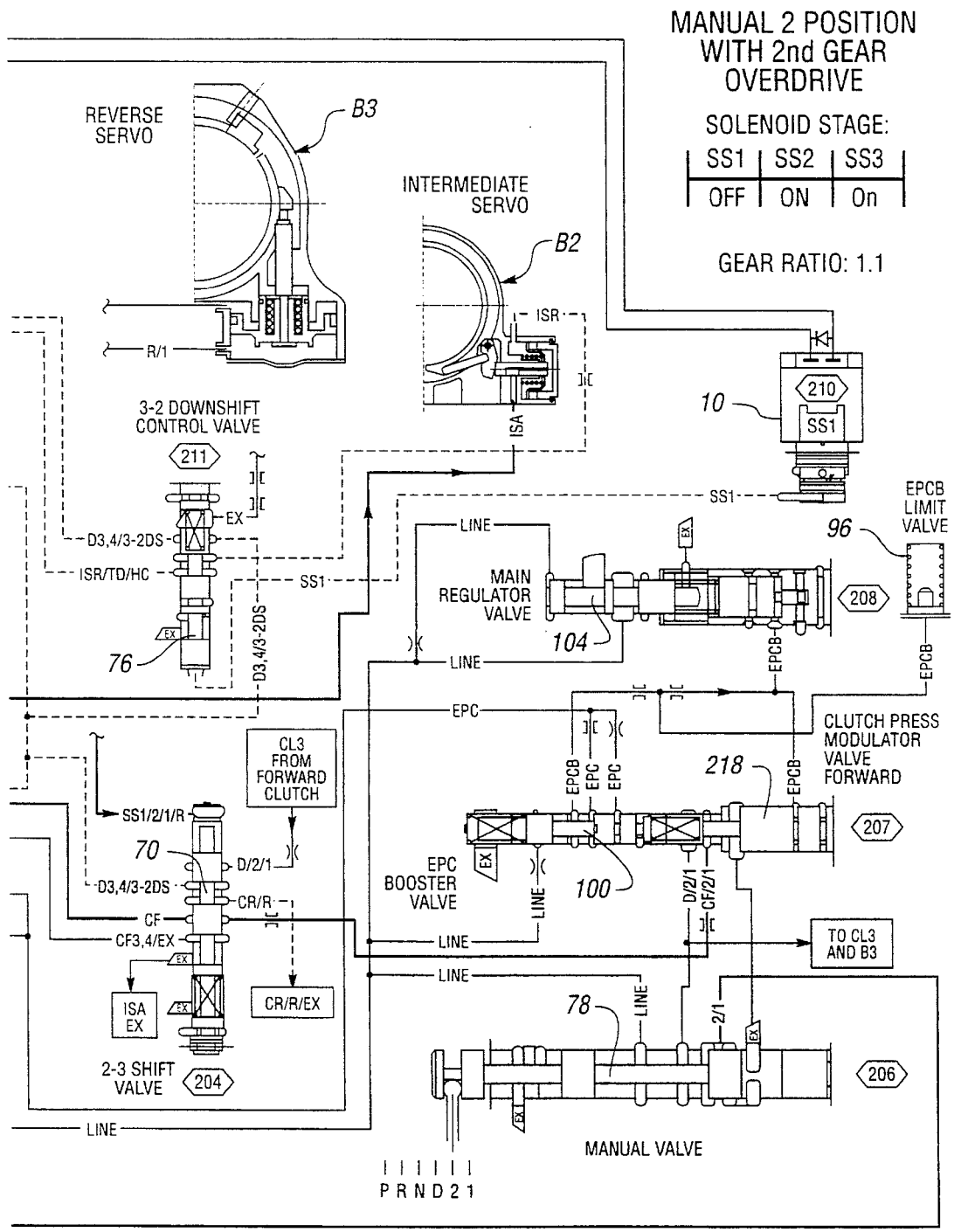

In order to describe the complete control strategy, the following parameters are used:

Control Strategy:
PDL manual lever position register
VSBART vehicle speed
EPC register
GR_CM commanded gear
FLG_SS_1 shift solenoid flag 1
FLG_SS_2 shift solenoid flag 2
FLG_SS_3 shift solenoid flag 3
N engine speed
NT turbine speed Pressures:
SS2 shift solenoid 2
SS3 shift solenoid 3
SS1 shift solenoid 1
HC high clutch pressure
ISR intermediate servo release pressure
OSR overdrive servo release pressure
ISA intermediate servo apply pressure
OSA overdrive servo apply pressure
RSA rear servo apply pressure
CCL coast clutch pressure Manual2 Control System In the MAN2 position, two different gear ratios are electronically controlled. FIGS. 6a and 6b show the system during operation in second gear plus overdrive with a gear ratio of 1.1. FIGS. 5a and 5b show the system during operation in second gear with a gear ratio of 1.474. The two different gear ratios are used to generate a 3–2 inhibition function when the driver pulls manual valve 78 into MANUAL2 position at high vehicle speeds. Two different solenoid stages are required to realize the two gear ratios. With SS1=OFF, SS2=ON and SS3=ON in MAN2 position, the hydraulic control system executes second gear plus overdrive. With shift solenoid 2 turned on, as seen at 12 in FIG. 5a, the 1–2 upshift valve 68 is in the upshift position and applies CF-pressure to the intermediate servo apply side as seen in FIG. 5b. The high clutch (CL2) and intermediate servo release (B1) are exhausted at the exhaust port in the 3–2 downshift td control valve 74 in bore 213 through the control orifice 272. The 2–3 shift valve 70 in bore 204 is in upshift position, as seen in FIG. 5b, with SS1/2/1/R pressure applied on the head of the valve disconnecting the D/2/1 feed pressure from the high clutch and intermediate servo release.

With shift solenoid 3 energized, as seen at 14 in FIG. 6a, the 3–4 shift control valve 72 is in upshift position and overdrive servo release pressure is exhausted through the CR/R/EX exhaust port of the 2–3 shift control valve 70 in bore 204, as seen in FIG. 6b. The overdrive servo apply side is connected with CF pressure. The overdrive band then transmits torque. The coast clutch CL1 is exhausted over the shift valves in bore 201 and 215 through the CL1 exhaust port. This configuration applies the intermediate band (B2), the overdrive band (B1) and the forward clutch (CL2), which generates a gear ratio of 1.1. Engine braking is provided by the engagement of the overdrive band.

When shift solenoid 3 is de-energized (see FIG. 5a) the 3–4 upshift valve 72 moves into downshift position and line pressure enters the overdrive servo release circuit 72 (see FIG. 5a). In the MAN2 position, the manual valve 78 in bore 206 generates 2/1 pressure. This 2/1 pressure is input to the 3–4 shift control valve 72 in bore 215. This pressure is directed over the downshifted 3–4 shift valve in bore 215 to the coast clutch control valve 88 in bore 201, and finally to the coast clutch CL1. This generates second gear with gear ratio 1.474 with engine braking. When the manual valve 78 is moved into D position, the normal automatic shift solenoid stages are executed as described previously.

Strategy Control System

In this section the 3–2 inhibition function is described when the driver pulls into MAN2 at higher vehicle speeds in coast mode. When the transmission has shifted into second gear, the control strategy keeps the transmission in second gear. The control strategy, in conjunction with the hardware during a 3–2 inhibition execution, is shown in FIG. 4.

t1:

Control Strategy:

The driver pulls the manual lever while driving in fourth gear from DRIVE into the MAN2 position. The EPC register loads coast boost pressure settings. Shift solenoid flag 2 FLG_SS_2 is set to 1. Since the GR_CM register is changed from 4 to 3, the shift solenoid flags FLG_SS_1 and FLG_SS_2 remain unchanged.

Control Hardware:

Shift solenoid 2 is energized and the 1–2 shift valve 68 in bore 203 and the MAN1 timing valve 84 in bore 212 move into upshift position. The 2–3 upshift valve 70 is moved into the upshift position executed by the SS1/2/1/R pressure. The D/2/1 pressure is disconnected from high clutch (CL2) and the intermediate servo release (B2) and exhausted through the exhaust port TD#2 with control orifice 273 at the 3–2 downshift control valve 74 in bore 213. The transition into second gear plus overdrive is initiated (see FIGS. 6a and 6b).

t2:

Control Hardware:

The intermediate servo has stroked and the intermediate band is applied providing a gear ratio of 1.1. Engine speed and turbine speed increase.

t3:

Control Strategy:

The vehicle speed drops below the 3–2 pull-in speed and shift solenoid flag 3 FLG_SS_3 is changed from 1 to 0. The gear commanded register changes from third to second and coast boost EPC pressure settings for second gear are commanded.

Control Hardware:

Shift solenoid 3, shown at 14 in FIG. 6a, is de-energized, and the 3–4 shift control valve 72 moves to downshift position. Line pressure is applied on the overdrive servo release side and 2/1 pressure is applied on the coast clutch CL1. The overdrive servo and the coast clutch start to stroke. OSA and ISA increases due to the higher EPC coast boost pressure settings.

t4:

Control Hardware:

The overdrive servo strokes and the coast clutch engages. The transmission is in second gear with engine braking in coast mode.

Manual "1" Control System

Hydraulic Control System

Figure 9A:
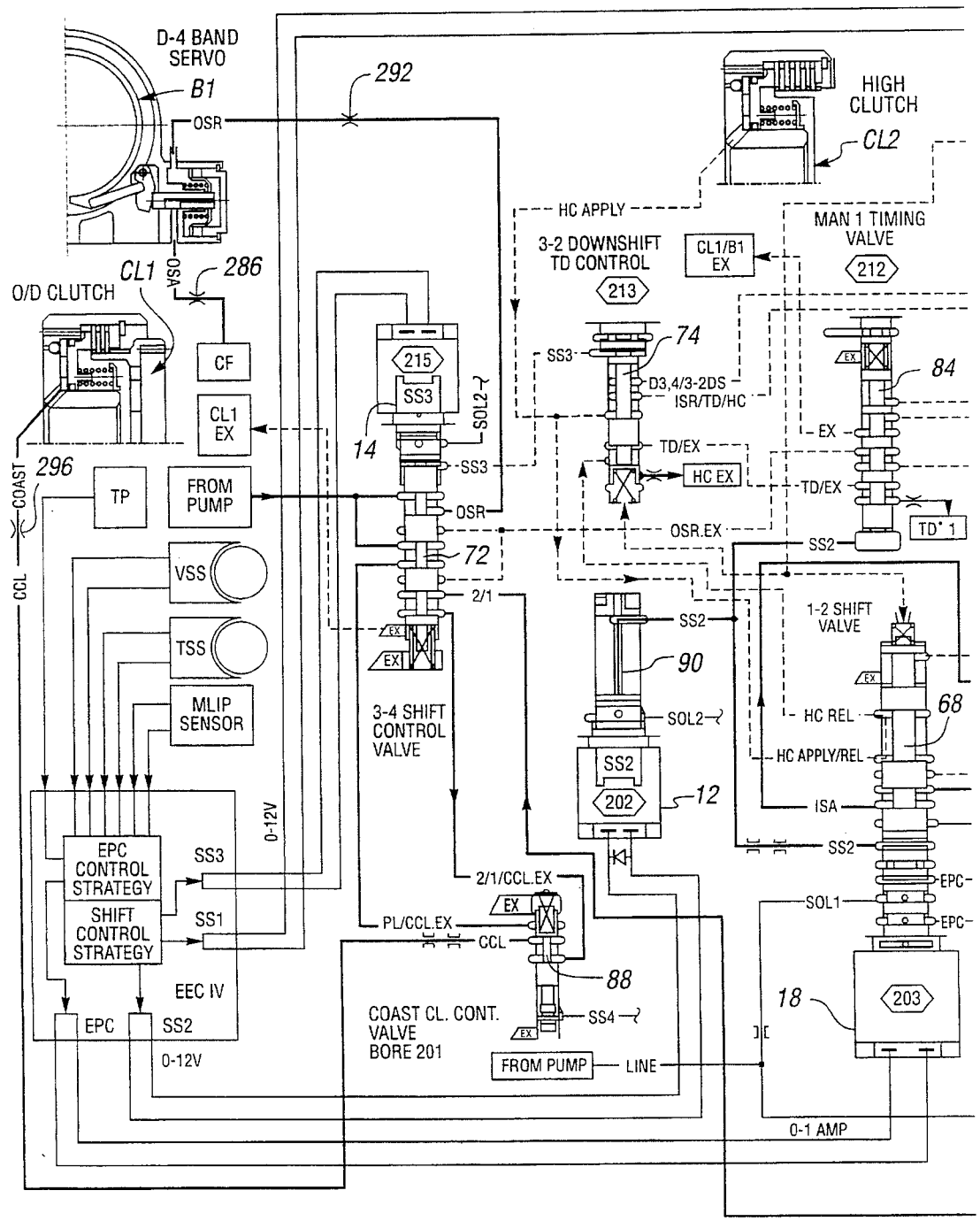
FIGS. 9a and 9b are a valve circuit diagram of the valve elements when they are positioned for 2nd gear operation when the manual valve is in the "1" position and the 3–2 shift inhibiting function or a manual 1–2 upshift function is in effect.
Figure 9B:
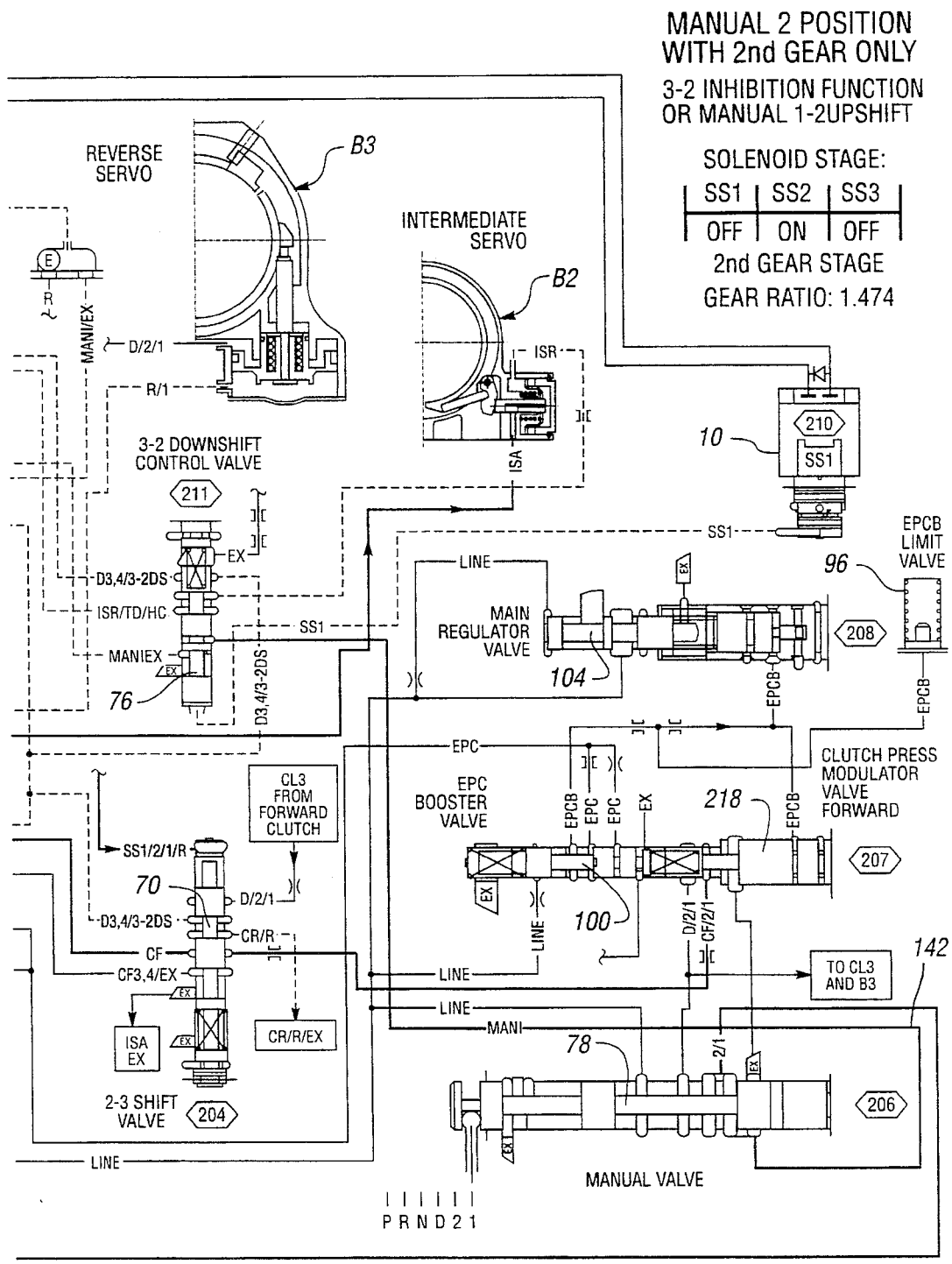
Figure 11A:
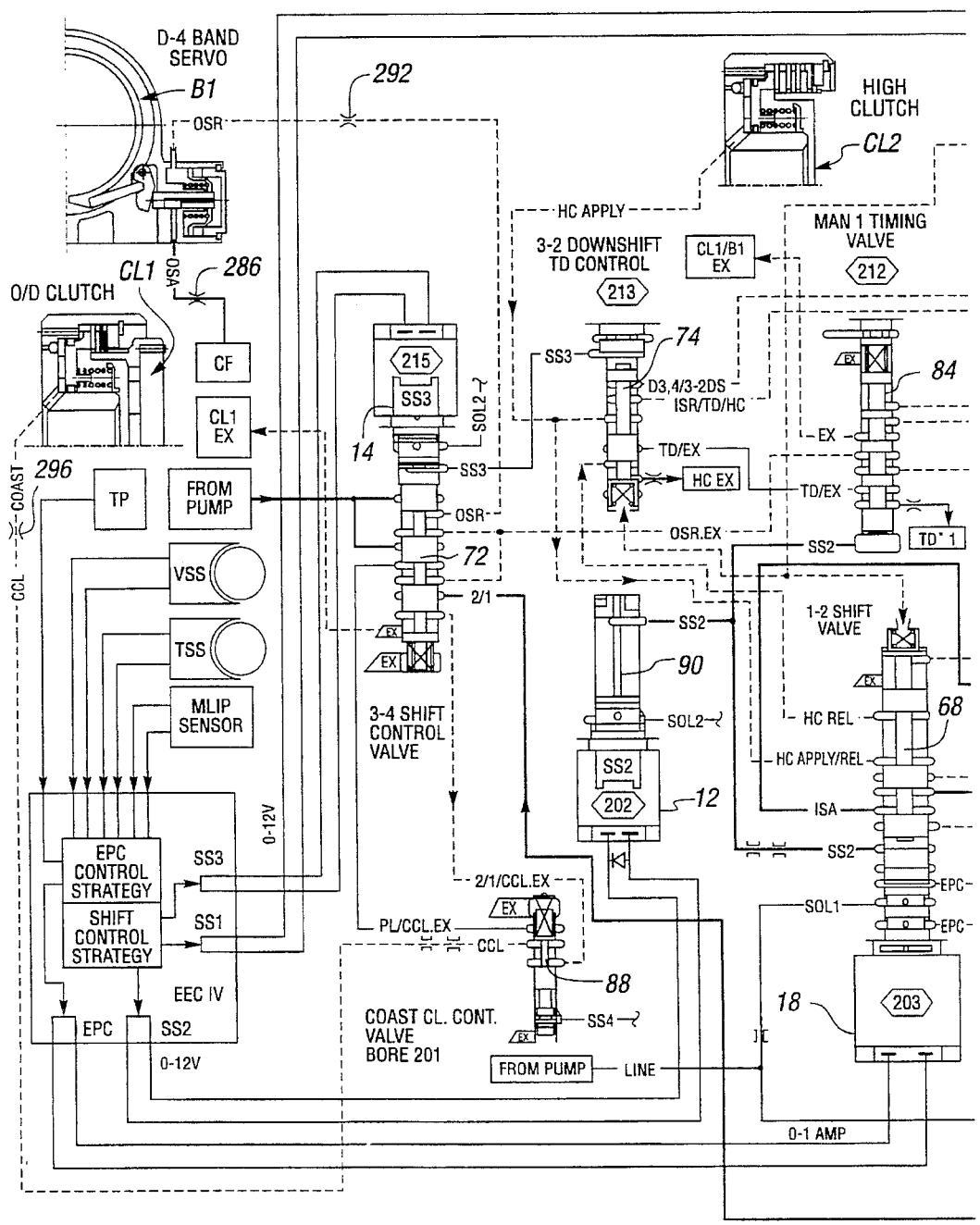
FIGS. 11a and 11b are a valve circuit diagram of the valve elements when they are operating in 2nd gear with overdrive and the manual valve is in the "1" position.
Figure 11B:
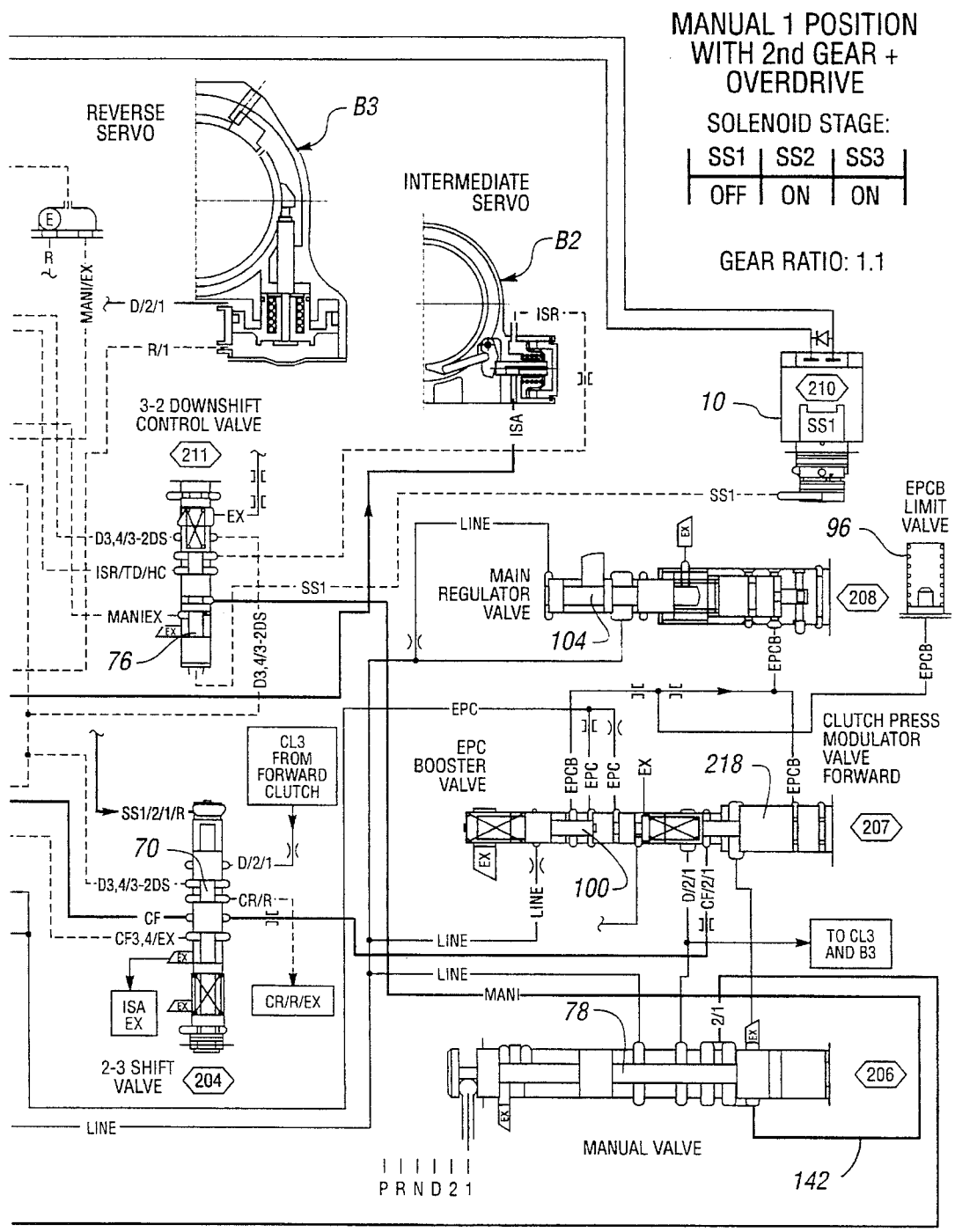

In the MAN1 position, three different gear ratios and gear selections are electronically controlled. The gear selections are second gear plus overdrive, second gear and first gear. All the gear selections are controlled with different solenoid stages. As described earlier, the gear changes from second plus overdrive to second gear represents the 3–2 inhibition function. This is executed in the same manner as in the MAN2 position. FIGS. 11a and 11b show second gear plus overdrive with solenoid stage SS1=OFF, SS2=ON and SS3=ON, and FIGS. 9a and 9b show the second gear position with the solenoid stage SS1=OFF, SS2=ON and SS3=OFF in the MAN1 position. The hydraulic system is basically the same as in MAN2 position. The only difference in this position is that the MAN1 hydraulic circuit 142 is pressurized by the manual valve 78. This MAN1 pressure is an input to the 3–2 downshift kd control valve 76 in bore 211 (FIG. 11b). Since the shift solenoid 1 is de-energized, the valve 76 in bore 211 is in downshift position and blocks the MAN1 pressure from entering into the MAN1/EX circuitry, which is connected to the manual "1" timing valve 84 in bore 212. This MAN1 pressure is supposed to apply the rear servo (B3) with pressure in first gear. This is prevented by the de-energized shift solenoid 10 (SS1) in second gear and second gear plus overdrive. This feature also prevents rear servo engagement when a power loss failure mode occurs and the transmission defaults into third gear.

Figure 10A:
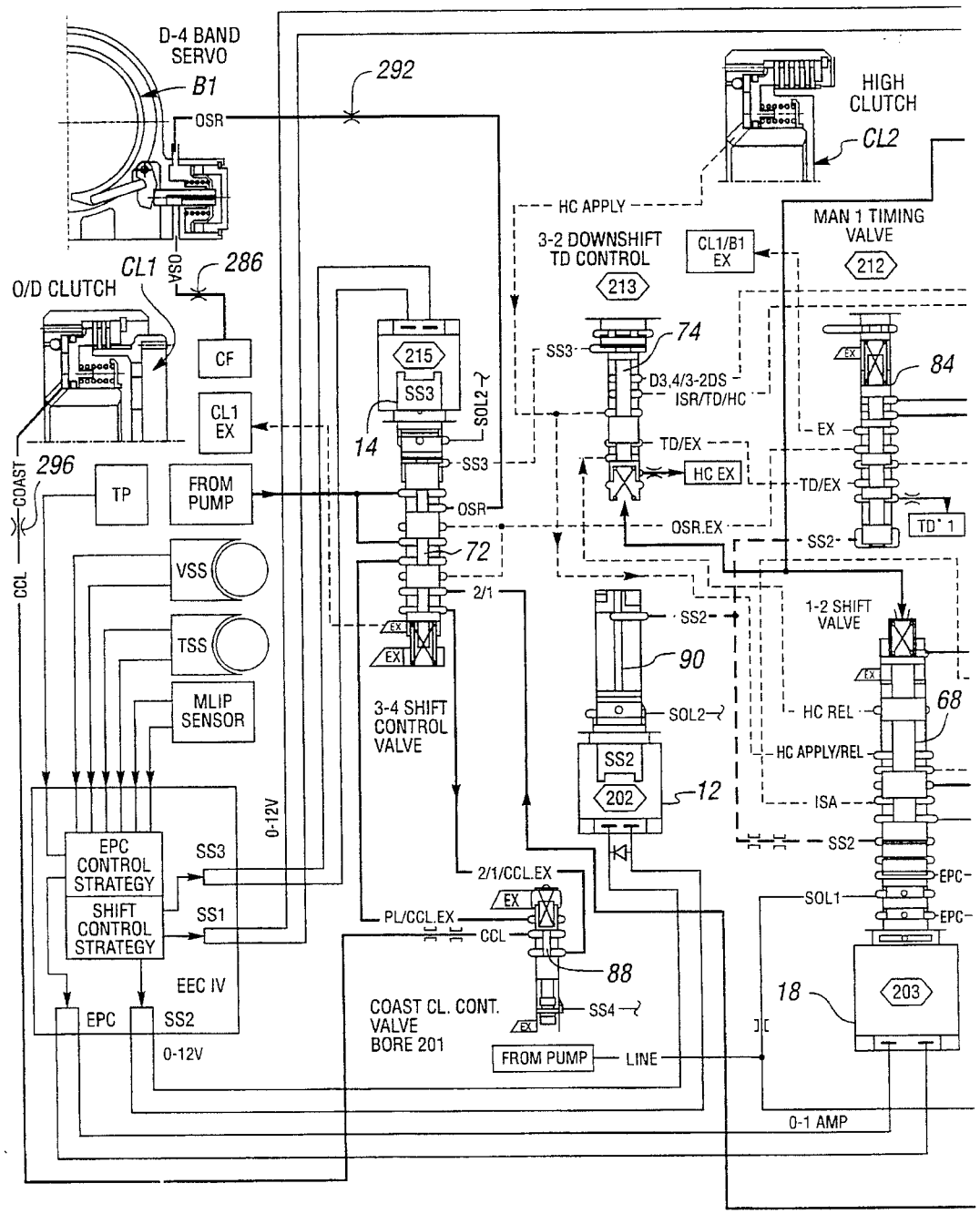
FIGS. 10a and 10b are a valve circuit diagram of the valve elements when they are positioned for 1st gear operation when the manual valve is in the "1" position and the 2–1 downshift inhibiting function is in effect.
Figure 10B:
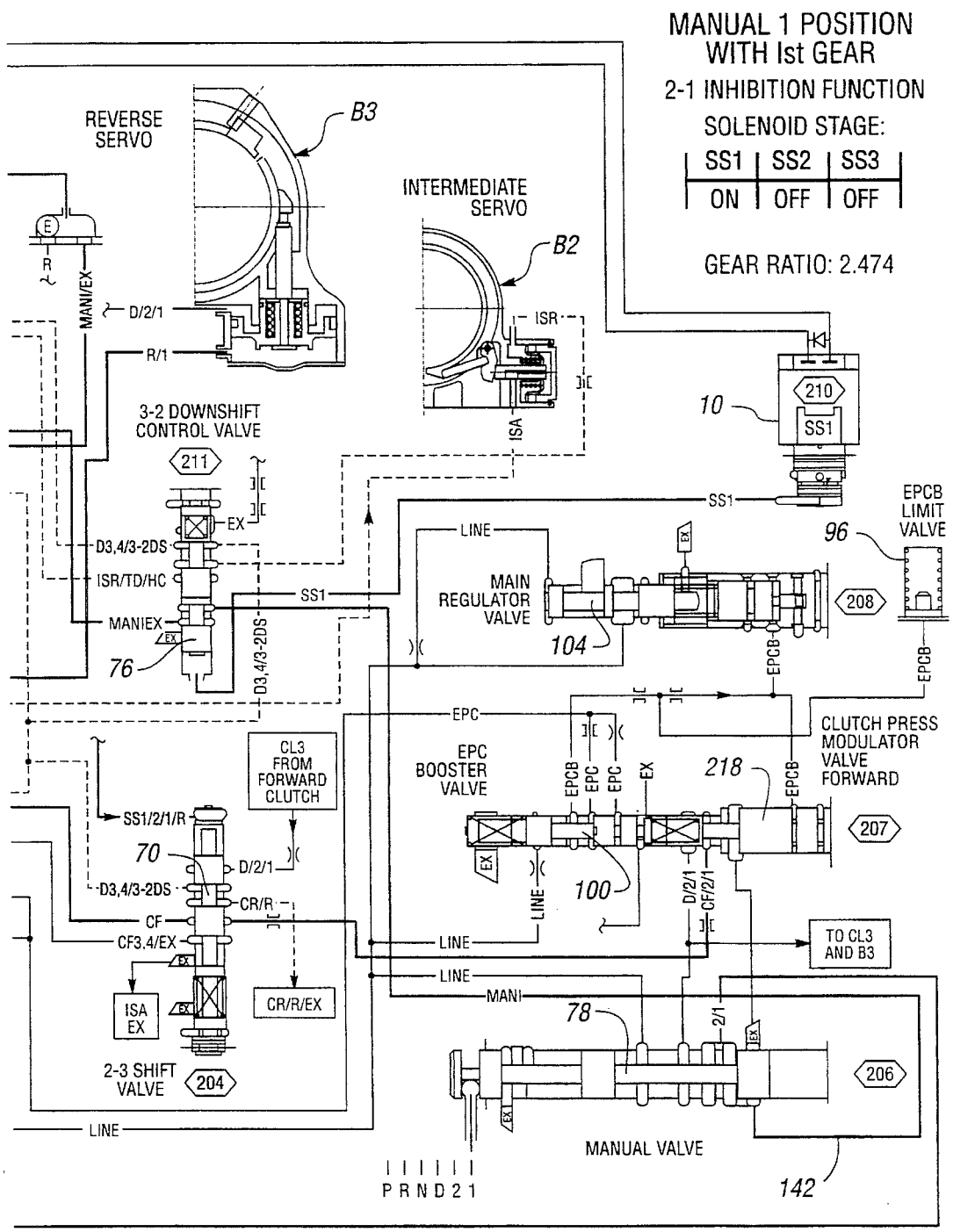

When a 2–1 inhibition function is executed, the shift solenoid 12 (SS2) is de-energized and shift solenoid 10 (SS1) is energized. Shift solenoid 14 (SS3) stays energized. With SS2 turned off, the timing valve 84 in bore 212 and the 1–2 upshift valve 68 in bore 203 move into downshift position. With the 1–2 shift valve downshifted, the intermediate servo apply pressure is exhausted over the CF/3/4/EX circuit through the ISA/EX port on the 2–3 upshift valve 70 in bore 204 (FIG. 9b). This shift valve 70 in bore 204 is normally actuated by shift solenoid 10 (SS1) and is hydraulically overridden with MAN1/MAN2 pressure. At the same time, the valve 76 in bore 211 moves into downshift position and allows MAN1 pressure to enter the MAN1/EX circuit. From there, the MAN1 pressure passes over the timing valve 84 in bore 212 and the two-way ball check valve 196 (See FIG. 3d) to the back side of the 1–2 upshift valve 68 in bore 203 (FIGS. 3e and 10a) and the downshift control valve 74 in bore 213. The MAN1 pressure on the back side of the 1–2 shift valve 68 hydraulically interlocks the 1–2 upshift valve 68 in the downshift position. This prevents a simultaneous engagement of the rear servo (B3) and the intermediate servo (B2) since the intermediate servo always stays exhausted independently of the state of shift solenoid 12 (SS2). This prevents simultaneous engagements of both elements. When the 1–2 upshift valve 68 is downshifted, MAN1 pressure is finally allowed to engage the rear servo apply side (B3). This provides engine braking in coast mode in first gear and in the MAN1 position. The coast clutch (CL1) is still engaged with 2/1 pressure over the 3–4 shift valve 72 in bore 215. All other elements except the forward clutch are exhausted over the same exhaust ports as in MAN2 position described previously.

A MANUAL 1–2 upshift then is executed. The shift solenoid 12 (SS2) is energized and shift solenoid 1 is de-energized. Since the 1–2 upshift valve 68 is hydraulically interlocked with MAN1 pressure, the shift solenoid SS2 pressure shifts the 1–2 upshift valve 68 into upshift position only when the rear servo apply pressure is smaller than solenoid SS2 pressure. The rear servo apply pressure is exhausted at the MAN1/EX port at the shift valve in bore 211.

2–1 Inhibition Function

Figure 7:
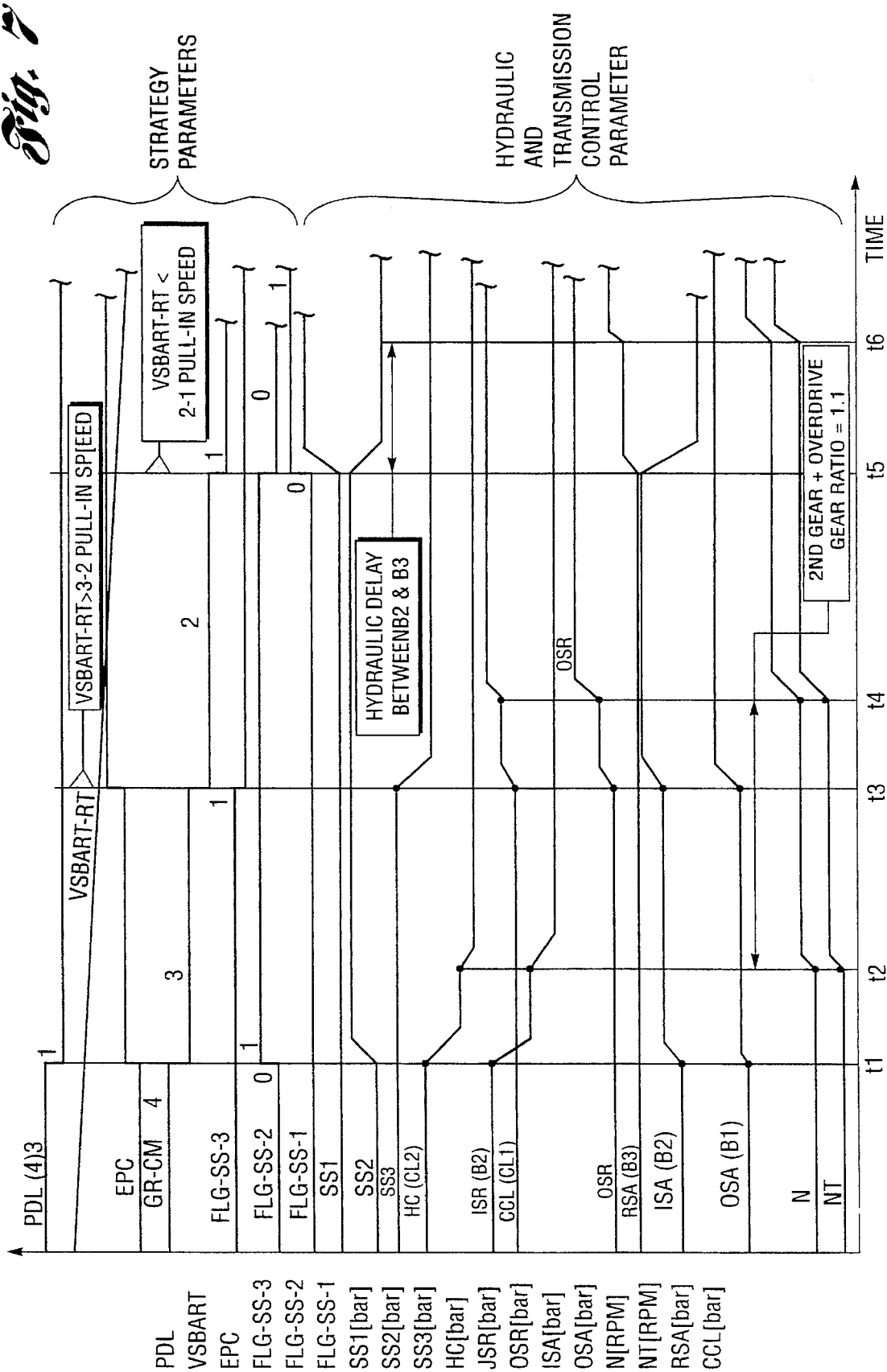
FIG. 7 is a timing diagram for 3–2 and 2–1 shift inhibiting functions (coast mode) with the manual valve in the "1" position.

When the driver pulls into the MAN1 position at higher vehicle speeds in coast mode, the control strategy first executes the 3–2 inhibition function and then the 2–1 inhibition function, depending on the vehicle speed. The vehicle speed, however, has to be higher than the 3–2 pull-in speed. When the vehicle speed is lower than the 3–2 pull-in speed, the control strategy commands second gear immediately and only the 2–1 inhibition function is executed. FIG. 7 shows the complete sequence of a 3–2 inhibition and a 2–1 inhibition function timing diagram. The timing points t1 through t4 represent the 3–2 inhibition function as explained previously. The 2–1 inhibition function is shown from t5 through t6.

t5:

Control Strategy:

The vehicle speed VSBART is smaller than the 2–1 pull-in speed. The GR_CM register changes from 2 to 1. Shift solenoid flag 1 FLG_SS_1 is set to 1 and shift solenoid flag 2 FLG_SS_2 is set from 1 to 0. The PDL register is changed from 3 or 4 to 1, indicating the MAN1 position. The 2–1 inhibition function is initiated.

Control Hardware:

Shift solenoid 10 (SS1) is energized and shift solenoid 12 (SS2) is de-energized. The rear servo apply starts to fill and to stroke. The intermediate servo apply pressure is exhausted. As long as the rear servo strokes, no engine braking takes place in coast mode since the capacity of the intermediate band is reduced instantaneously by releasing the intermediate servo apply pressure.

t6:

The rear servo (B3) has stroked and engages with engine braking taking place. The engine speed and the turbine speed rise. The 2–1 inhibition is executed.

Manual 1–2 Upshift

FIG. 8 shows a power on manual 1–2 upshift. The manual 1–2 upshift is basically the inverse function of the 2–1 inhibition function. The control strategy commands independently of shift pattern and only according to the state of PDL register when a manual 1–2 upshift is commanded. The manual 1–2 shift functions as follows:

t1:

Control Strategy:

The driver desires a manual 1–2 upshift by moving the manual lever from position 1 to position 2. The PDL register changes from 1 to 2, indicating a manual 1–2 upshift. The EPC pressure settings are according to the capacity requirements for a manual 1–2 upshift.

t2:

Control Strategy:

The GR_CM register changes from 1 to 2. The shift solenoid flag FLG_SS_2 is changed from 0 to 1 and the shift solenoid flag 1 FLG_SS_1 is changed from 1 to 0.

Control Hardware:

Shift solenoid 10 (SS1) is de-energized and the shift solenoid 12 (SS2) is energized. The timing valve 84 and the shift valve 68 in bores 212 and 203, respectively, move into their upshift positions and the control valve 76 in bore 211 moves into a downshift position. The 1–2 upshift valve 68 moves into the upshift position only when the rear servo pressure is completely exhausted. The rear servo apply pressure exhausts over the MAN1/EX port at the control valve 76 in bore 211 and the intermediate servo is applied when the rear servo apply pressure is lower than the applied shift solenoid 12 (SS2) pressure. The hydraulic delay between the two elements is found by the 1–2 upshift valve 68 in bore 203 interlocked with MAN1 pressure. The rear servo starts to stroke back into the installed position.

t3:

The rear servo completes the stroke and the intermediate servo is applied. The manual 1–2 upshift is now executed. The engine speed and the turbine speed rise.

Summary

The 3–2 and 2–1 inhibition function for certain known transmissions are executed with differential areas on the 1–2 and 2–3 shift valves. The inhibition functions also requires a coast boost system, which produce the required coast boost pressure applied on the differential areas of the shift valves. The governor pressure is in equilibrium with the coast boost pressure when the 1–2 or 2–3 shift valves are shifted to either the MAN1 or MAN2 positions. This equilibrium condition generates also the 3–2 and 2–1 pull-in speeds since governor pressure is proportional to vehicle speed. When different pull-in speeds are required, different differential areas on the shift valves have to be implemented. With the present transmission, this function is executed with the same shift valve configuration as for conventional automatic upshifts. The 3–2, 1–2 inhibition function is executed by the shift solenoids, and the pull-in speeds are determined by the vehicle speed sensor and throttle position sensor. The advantage of this is that the 2–1 or 3–2 pull-in speed can be calibrated individually for each vehicle line without changing the hardware. This also contributes to complexity reduction.

Although we have described preferred embodiments of our invention, the scope of our invention, as defined by the following claims, is intended to cover various modifications that may become apparent to a skilled artisan following the teachings of this specification.

Having described preferred embodiments of our invention, what we claim and desire to secure by U.S. Letters Patent is:

1. A multiple ratio automatic transmission for an automotive vehicle for delivering power from an internal combustion engine to a driven member including a torque converter having an impeller driven by said engine and a turbine, a main multiple ratio gear unit having torque output elements connected to said driven member, an overdrive gear unit having a torque input element connected to said turbine and torque output elements connected to torque input elements of said main gear unit, said main gear unit and said overdrive gear unit together producing multiple overall transmission gear ratios;

main gear unit clutch and brake means for selectively anchoring elements of said main gear unit and for selectively clutching together elements of said main gear unit to effect operation of said main gear unit in three forward driving gear ratios, said clutch and brake means including fluid pressure actuators;

a control valve circuit including a line pressure pump driven by said engine and a control valve means in said circuit for selectively distributing and releasing line pressure to and from said pressure actuators, said circuit including shift valve elements;

electronic shift solenoid valve means for selectively actuating said shift valve elements to effect ratio changes in said main gear unit in response to changes in operating variables of said engine and transmission;

said overdrive gear unit having overdrive clutch and brake means responsive to pressure distributed thereto by said shift valve means to effect unitary ratio and overdrive ratios in said overdrive gear unit;

operator-movable manual valve means in said circuit for selectively distributing said line pressure to said shift valve elements as determined by positions of said manual valve means selected by the vehicle operator, said manual valve positions including a manual "1" position and a manual "2" position;

said manual valve means, when it is in manual "2" position, distributing line pressure to said shift valve means to inhibit ratio changes in said main gearing between second ratio and first ratio in said main gearing, said line pressure acting on said shift valve means to create a shift inhibiting pressure force thereon to effect continuous transmission operation in said second ratio in said main gear unit, said overdrive gear unit operating in unitary ratio or overdrive ratio as ratio changes in said main gear unit are inhibited.

2. The transmission as set forth in claim 1 wherein said clutch and brake means include a first friction brake for anchoring a low ratio reaction brake and a second intermediate ratio reaction brake in said main gear unit for respectively establishing low and intermediate ratios;

said manual valve means distributing line pressure to said shift valve means when it is in manual "1" position whereby said first and second brakes are applied and released, one exclusive of the other, as ratio changes in said main gear unit occur in response to said changes in operating variables.

3. The combination as set forth in claim 1 wherein said shift valve elements include shift inhibition pressure areas, said manual valve means distributing line pressure to said shift inhibition areas upon movement of said shift valve elements to their respective positions for second overall transmission ratio operation and third overall transmission ratio operation by said electronic shift solenoid valve means, whereby the values for said operating variables to effect said ratio changes during manual "1" operation and manual "2" operation can be independently calibrated.

4. The combination as set forth in claim 2 wherein said shift valve elements include shift inhibition pressure areas, said manual valve means distributing line pressure to said shift inhibition areas upon movement of said shift valve elements to their respective positions for second overall transmission ratio operation and overall transmission ratio operation by said electronic shift solenoid valve means, whereby the values for said operating variables to effect said ratio changes during manual "1" operation and manual "2" operation can be independently calibrated.

* * * * *